United States Patent
Baqai et al.

(10) Patent No.: US 11,189,017 B1
(45) Date of Patent: Nov. 30, 2021

(54) GENERALIZED FUSION TECHNIQUES BASED ON MINIMIZING VARIANCE AND ASYMMETRIC DISTANCE MEASURES

(71) Applicant: Apple Inc., Cupertino, CA (US)

(72) Inventors: Farhan A. Baqai, Fremont, CA (US); Gijesh Varghese, Milpitas, CA (US); Hao Sun, San Jose, CA (US); Tak Shing Wong, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 16/563,273

(22) Filed: Sep. 6, 2019

Related U.S. Application Data

(60) Provisional application No. 62/729,758, filed on Sep. 11, 2018.

(51) Int. Cl.
  *G06T 5/00* (2006.01)
  *G06T 5/50* (2006.01)
  *G06K 9/62* (2006.01)

(52) U.S. Cl.
  CPC .............. *G06T 5/50* (2013.01); *G06K 9/6202* (2013.01); *G06K 9/629* (2013.01); *G06T 5/003* (2013.01)

(58) Field of Classification Search
  CPC ......... G06T 5/50; G06T 5/003; G06K 9/6202; G06K 9/629
  See application file for complete search history.

(56) References Cited

U.S. PATENT DOCUMENTS

| | | |
|---|---|---|
| 7,706,497 B2 | 4/2010 | Hsieh |
| 8,705,831 B2 | 4/2014 | Koehler |
| 8,885,976 B1 | 11/2014 | Kuo |
| 10,033,927 B2 | 7/2018 | Molgaard |
| 2003/0161545 A1 | 8/2003 | Gallagher |
| 2013/0064470 A1 | 3/2013 | Suzuki |
| 2014/0218540 A1 | 8/2014 | Geiss |
| 2014/0219552 A1 | 8/2014 | Porikli |
| 2014/0219578 A1 | 8/2014 | Peng |

(Continued)

OTHER PUBLICATIONS

Chen et al. Robust multi-focus image fusion using edge model and multi-matting IEEE Transactions on Image Processing vol. 27, Issue 3, Mar. 2018 p. 1526-1541 (Year: 2018).*

*Primary Examiner* — Ping Y Hsieh
*Assistant Examiner* — Xiao Liu
(74) *Attorney, Agent, or Firm* — Blank Rome LLP

(57) ABSTRACT

Devices, methods, and computer-readable media describing an adaptive approach for image selection, fusion, and noise reduction, e.g., to generate low noise and high dynamic range (HDR) images with improved motion freezing in a variety of capturing conditions. An incoming image stream may be obtained from an image capture device, wherein the image stream comprises a variety of differently-exposed captures, e.g., EV0 images, EV− images, EV+ images. When a capture request is received, a set of rules may be used to evaluate one or more capture conditions associated with the images from the incoming image stream and determine which two or more images to select for a fusion operation. The fusion operation may be designed to adaptively fuse the selected images, e.g., in a fashion that is determined to be optimal from a noise variance minimization standpoint. A fusion-adaptive noise reduction process may further be performed on the resultant fused image.

17 Claims, 10 Drawing Sheets

(56) References Cited

U.S. PATENT DOCUMENTS

| | | |
|---|---|---|
| 2014/0300608 A1 | 10/2014 | Patil |
| 2015/0030258 A1 | 1/2015 | Chen |
| 2015/0078661 A1 | 3/2015 | Granados |
| 2016/0125630 A1 | 5/2016 | Narahari |
| 2016/0335782 A1 | 11/2016 | Sundaresan |
| 2016/0344845 A1 | 11/2016 | Shuman |
| 2016/0344945 A1 | 11/2016 | Kano |
| 2017/0069059 A1 | 3/2017 | Urfalioglu |
| 2017/0127039 A1 | 5/2017 | Liu |
| 2017/0142312 A1* | 5/2017 | Dal Mutto ........... H04N 13/239 |
| 2019/0108622 A1 | 4/2019 | Douady-Pleven |
| 2019/0333200 A1* | 10/2019 | Li ........................ H04N 5/2355 |
| 2019/0370948 A1* | 12/2019 | Tico ........................ G06K 9/46 |
| 2019/0378270 A1 | 12/2019 | Ida |
| 2020/0267339 A1* | 8/2020 | Douady-Pleven ... H04N 19/176 |

* cited by examiner

GENERALIZED FUSION TECHNIQUES BASED ON MINIMIZING VARIANCE AND ASYMMETRIC DISTANCE MEASURES

TECHNICAL FIELD

This disclosure relates generally to the field of digital image processing. More particularly, but not by way of limitation, it relates to techniques for an adaptive approach to image bracket selection, fusion, and noise reduction, e.g., in order to generate low noise and high dynamic range (HDR) images in a wide variety of capturing conditions.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being obtained in a streaming fashion), a device condition measurement (such as an image captured with the least amount of device rotation), or any other image condition or set of conditions desired by a given implementation.

A "distance measure" may then be used to determine if the pixels in the candidate images are sufficiently similar to the corresponding pixel in the reference image to be included in the fusion operation. If the distance measure between a given candidate pixel in a candidate image and the corresponding pixel in the reference image is below a distance threshold, e.g., a noise-dependent distance threshold, the candidate pixel is deemed sufficiently similar, and it may be used to contribute to the final fused result for that pixel.

Often, there can be significant capture time differences between the images that are to be fused, and, therefore, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. The appearance and characteristics of ghosting artifacts may vary from image to image. For example, a section of the image that has a certain color in the reference image, but has different colors in the other candidate images will, when combined with the candidate images, result in a faded look or a false color region that is potentially noticeable by a viewer of the final fused image. On the other hand, an edge area or a textured area that moves over time across the captured images may, when fused, have visible multi-edges (e.g., double edges, triple edges, etc.), which may also be noticeable in the final fused image. Thus, in some embodiments, avoiding ghosting artifacts may be desirable when fusing multiple image frames for the purpose of noise reduction and/or improved image quality.

Despite these potential difficulties, in general, by fusing multiple images together, a better quality resultant image may be achieved than may be obtained from a single image capture. The multiple image captures used in a given fusion operation may comprise, e.g.: multiple images captured with the same exposure (e.g., for the purposes of freezing motion), which will be referred to herein as Still Image Stabilization (SIS); multiple images captured with different exposures (e.g., for the purposes of highlight recovery, as in the case of High Dynamic Range (HDR) imaging); or a combination of multiple images captured with shorter and longer exposures, as may be captured when an image capture device's Optical Image Stabilization (OIS) system is engaged, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

Thus, what is needed is an approach to adaptively fuse (and/or denoise) bracketed captures of arbitrary exposures, such that the fused result is optimal, e.g., in a statistical sense, for a given set of capturing conditions and predicted noise models.

SUMMARY

Various devices, methods, and non-transitory program storage devices are disclosed herein that take an adaptive approach for image bracket selection, fusion, and/or noise reduction, in order to generate low noise and high dynamic range images in a wide variety of capturing conditions. More particularly, an incoming image stream may be obtained from an image capture device, wherein the incoming image stream may comprise a variety of different bracketed image captures, which are, e.g., received in a particular sequence and/or according to a particular pattern. When a capture request is received, the method may then select two or more images from the incoming image stream for fusion, e.g., based on an evaluation of one or more capture conditions.

According to some embodiments, the selected two or more images for fusion may comprise a reference image and one or more candidate images. The one or more candidate images may then be registered with the reference image, e.g., via a global and/or local image registration process. Then, for each pixel in the reference image, a corresponding pixel will be located in each of the one or more candidate images.

Next, a weight value may be derived for each pixel in the reference image and each corresponding pixel in each of the one or more candidate images. According to some embodiments, the weight value for a given pixel may comprise a weight that is derived or determined, such that the variance of the fused pixel estimates for the resultant fused image is minimized (i.e., a "minimum variance fusion weight"). The set of weight values for a given image will also be referred to herein as a weight map.

In some embodiments, as will be described in greater detail below, the weight value for each corresponding pixel in the one or more candidate images may reflect the evaluation of a distance measure between the reference pixel and the respective corresponding candidate image pixel (i.e., a measure of how different the signal value is between the reference pixel and the corresponding candidate image pixel). For example, in some instances, the distance measure may be an asymmetric distance measure, which will be described in greater detail below.

In other embodiments, the evaluation of the distance measure may result in a binary determination that drives the inclusion (or exclusion) of pixels from participation in the image fusion process. For example, a candidate image pixel may be included in the fusion process if it is within a similar pixel threshold of the corresponding reference image pixel, and the candidate image pixel may be excluded from the fusion process if it is not within the similar pixel threshold of the corresponding reference image pixel.

In still other embodiments, rather than providing a binary determination of inclusion or exclusion of a given pixel to the image fusion process, the weight value may further comprise a weight that provides for a tunable amount of inclusion or influence of a given candidate image pixel to the fusion process, e.g., based on a determined degree of similarity between the given candidate image pixel and the corresponding reference image pixel (i.e., a "similarity weight").

Once the desired fusion weight values have been determined for each pixel in each image that will contribute to the fusion process, a fused image may be created. The resultant fused image, according to some embodiments, will comprise an image that has been adaptively fused based on an arbitrary number (and type) of constituent images, and which is optimal, e.g., in a statistical sense, for the given set of capturing conditions and predicted noise models of the constituent images. ("Constituent image," as used herein, refers to an image that is used in the creation of a resultant fused image. Constituent images may comprise, e.g., a reference image and one or more candidate images for a given resultant fused image.)

In still other embodiments, e.g., embodiments wherein it is also desired that noise reduction is applied, an improved fusion-adaptive noise map may be created that is, e.g., based upon predetermined (or derived) noise models for the various types of constituent images that are utilized in the fusion process, as well as the respective contributions of each pixel to the resultant fused image. In some embodiments, the contributions are those determined by the weight values of the aforementioned adaptive fusion process. In other embodiments, the noise models for the various constituent images may be further modified according to a boosting factor, e.g., wherein a magnitude of the boosting factor is based, at least in part, on the exposure settings of the respective constituent image.

According to some embodiments, the noise reduction operation, e.g., utilizing the improved fusion-adaptive noise map, only needs to be applied at a single place in the image fusion processing pipeline, i.e., on the resultant adaptively-fused image. This may present additional improvements over prior image fusion schemes, wherein noise reduction is applied to each constituent image individually, i.e., before the fusion operation.

As mentioned above, various non-transitory program storage device embodiments are disclosed herein. Such program storage devices are readable by one or more processors. Instructions may be stored on the program storage devices for causing the one or more processors to: obtain an incoming image stream from one or more image capture devices; select two or more images from the incoming image stream, wherein one of the selected two or more images is designated to be a reference image, and wherein the selected two or more images that are not designated to be the reference image are designated to be candidate images; for each candidate image: register the respective candidate image to the reference image, wherein the registration provides a correspondence between the reference image and the respective candidate image; derive weight maps corresponding to each candidate image and the reference image, wherein each derived weight map comprises a plurality of values corresponding to pixels in the weight map's corresponding image, and wherein each value in a weight map defines indicates an amount of contribution the corresponding pixel in the weight map's corresponding image will have in a fusion operation; fuse each registered candidate image and the reference image according to the derived weight maps to form a fused image; and store the fused image in the memory.

According to other embodiments, instructions may be stored on program storage devices for causing the one or more processors to: obtain an incoming image stream from one or more image capture devices; select two or more images from the incoming image stream, wherein one of the selected two or more images is designated to be a reference image, and wherein the selected two or more images that are not designated to be the reference image are designated to be candidate images; for each candidate image: register the respective candidate image to the reference image, wherein the registering registration provides a correspondence between the reference image and the respective candidate image; derive weight maps corresponding to each candidate image and the reference image, wherein each derived weight map comprises a plurality of values corresponding to pixels in the weight map's corresponding image, and wherein each value in a weight map indicates defines an amount of contribution the corresponding pixel in the weight map's corresponding image will have in a fusion operation; fuse each registered candidate image and the reference image according to the derived weight maps to form a fused image; obtain noise maps corresponding to each candidate image and the reference image, wherein each obtained noise map comprises a plurality of values corresponding to estimated noise variance in the pixels in the noise map's corresponding image; derive a combined noise map, wherein each value in the combined noise map indicates an amount of noise reduction to be applied to the corresponding pixel in the fused image in a noise reduction operation, and wherein each value in the combined noise map is based, at least in part, on the corresponding values in the obtained noise maps; perform noise reduction on the fused image according to the derived combined noise map to form a noise-reduced, fused image; and store the noise-reduced, fused image in the memory.

According to yet other embodiments, instructions may be stored on program storage devices for causing the one or more processors to: obtain an incoming image stream from one or more image capture devices; select two or more images from the incoming image stream for fusion; fuse the selected two or more images to form a fused image; obtain noise maps corresponding to each of the selected two or more images, wherein each obtained noise map comprises a plurality of values corresponding to estimated noise variance in the pixels in the noise map's corresponding selected image; derive a combined noise map, wherein each value in the combined noise map indicates an amount of noise reduction to be applied to the corresponding pixel in the fused image in a noise reduction operation, and wherein each value in the combined noise map is based, at least in part, on the corresponding values in the obtained noise maps; perform noise reduction on the fused image according to the derived combined noise map to form a noise-reduced, fused image; and store the noise-reduced, fused image in the memory.

Various methods of taking an adaptive approach to image bracket fusion and noise reduction are also disclosed herein, in accordance with the program storage device embodiments enumerated above. Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various embodiments enumerated above.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

A 'Unified' Approach to Adaptive Bracketed Image Capture

Figure 1A:
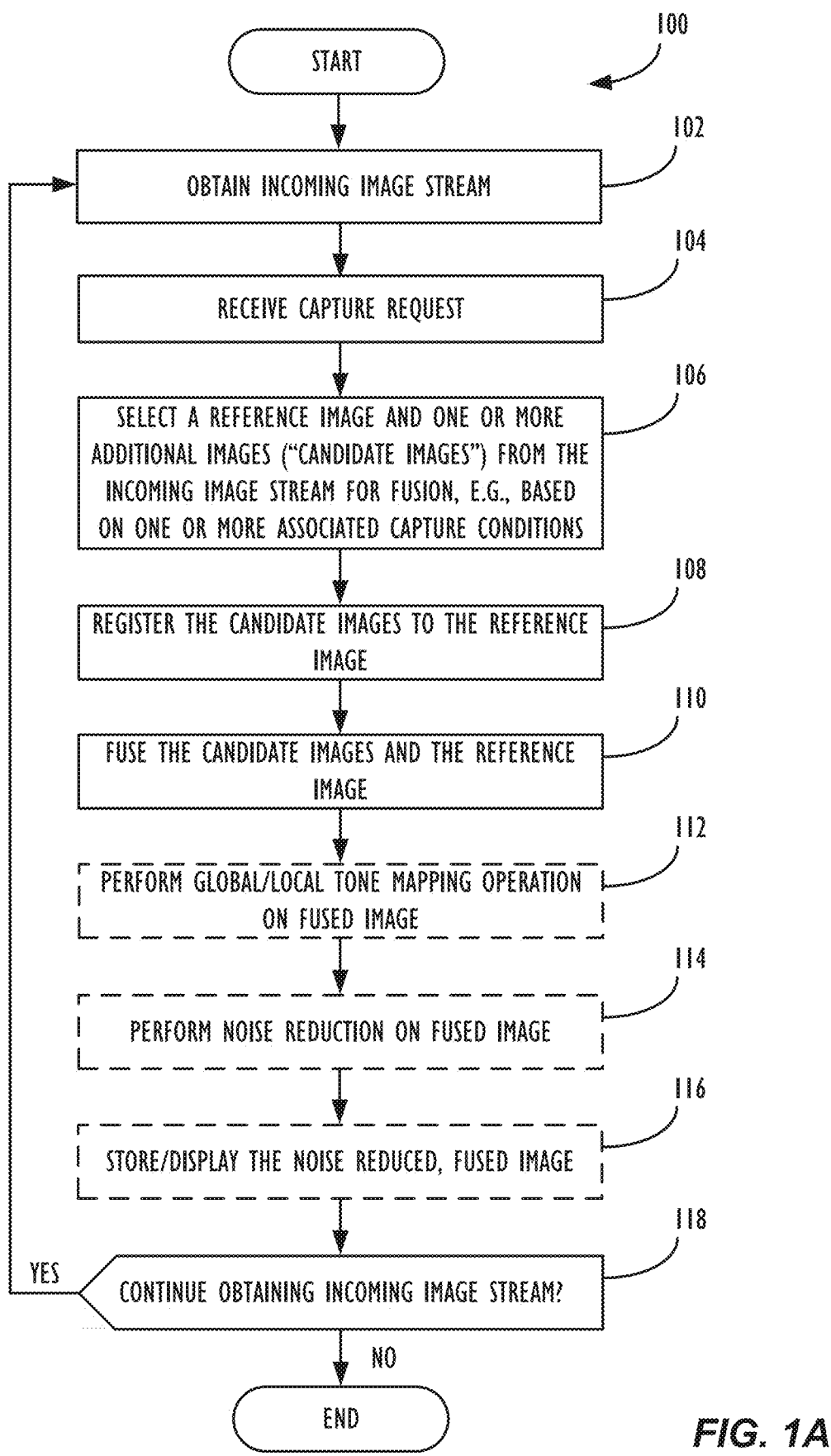
FIG. 1A is flow chart illustrating a method of adaptive image bracket selection, fusion, and noise reduction, according to one or more embodiments.

Referring now to FIG. 1A, a flow chart 100 illustrating a method of adaptive image bracket selection, fusion, and noise reduction is shown, according to one or more embodiments. First, the process 100 may begin by obtaining an incoming image stream (Step 102), e.g., comprising images captured by one or more cameras or other image capture devices. As will be explained in further detail below, the incoming image stream may comprise two or more differently-exposed images.

According to some embodiments, one or more (up to all) of the images in the incoming image stream may be encoded in a way to preserve low-light details, e.g., tone mapped via a square root encoding. In some embodiments, it may be desirable for the chosen encoding method to be invertible, such that, during fusion, the encoding of the captured image frames may be inverted, and areas of ghosting artifacts may be accurately identified. In other words, in order to be able to compare the corresponding pixel values between the reference image and other candidate images to identify potential ghost pixels (i.e., those pixels that are very different from their corresponding reference pixels), the pixel values must first be made comparable to one another by accounting for any differences in encoding. For example, the inversion of a tone mapping curve that applies a square root encoding would be a tone mapping curve that applies a squaring function (i.e., raises the input value to the power of two). While a number of suitable encoding techniques may be used, it may be desirable to select an encoding technique that is relatively quick and reliable to help balance processing time and accuracy during encoding and inversion.

According to some embodiments, the encoding of the images from the incoming image stream may occur directly after each respective image's capture time (or subsequently thereafter, e.g., after any additional desired processing steps are performed on the respective image data). In some instances, the encoding operation may be performed directly by an Image Signal Processor (ISP), e.g., when converting the RAW image data captured from an image sensor into a different color space, e.g., the YUV color space (or other desired color space). In some embodiments, e.g., based on ambient lux levels, one or more captured images may not be encoded and, e.g., may be left in the linear domain, for the fusion operation. In some instances, e.g., square root encoding (or other low-light detail preserving schemes) may not be employed if a captured image is taken in a scene having greater than a threshold lux level, i.e., where there are unlikely to be many low-light details to preserve. In such instances, the particular images would not need to be inverted before being registered and/or fused with the other images selected for the fusion operation, as will be explained in greater detail below.

Discussion will now turn to the nomenclature that will be used herein to refer to the various differently-exposed images from the incoming image stream. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV−, EV0, EV+, and/or other long exposure images. It is further noted that the image stream may also comprise a combination of arbitrary exposures, as desired by a given implementation or operating condition, e.g., EV+2, EV+4, EV−3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). A long exposure image may come from a single image captured from a single camera, or, in other instances, a long exposure image may be "synthesized" from multiple captured images that are fused together (which will be referred to herein as a "synthetic long exposure image"). In instances where the image capture device is capable of performing OIS, the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types of long exposure images, e.g., depending on capture conditions. For example, in some embodiments, a synthetic long exposure image may be created when the image capture device does not or cannot perform OIS, while a single long exposure image may be captured when an OIS system is available and engaged at the image capture device. According to some embodiments, in order to recover a desired amount of shadow detail in the captured image, some degree of overexposure (e.g., EV+2) may intentionally be employed in bright scenes and scenes with medium brightness. Thus, in certain brighter ambient light level conditions, the long exposure image itself may also comprise an image that is overexposed one or more stops with respect to EV0 (e.g., EV+3, EV+2, EV+1, etc.). To keep brightness levels consistent across long exposure images, the gain may be decreased proportionally as the exposure time of the capture is increased. Generally speaking, brightness is proportional to a product of aperture area, gain, and exposure time.

In some embodiments, long exposure images may comprise images captured with greater than a minimum threshold exposure time, e.g., 50 milliseconds (ms) and less than a maximum threshold exposure time, e.g., 250 ms. In other embodiments, long exposure images may comprise images captured with a comparatively longer exposure time than a corresponding normal or "short" exposure image for the image capture device, e.g., an exposure time that is 4 to 30 times longer than a short image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether the image capture device is using an OIS system during the capture operation.

As will be discussed further below with respect to FIGS. 3A and 3B, the noise level in a given image may be estimated based, at least in part, on the system's gain level (with larger gains leading to larger noise levels). Therefore, in order to have low noise, an image capture system may desire to use small gains. However, as discussed above, the brightness of an image may be determined by the product of exposure time and gain. So, in order to maintain the image brightness, low gains are often compensated for with large exposure times. However, longer exposure times may result in motion blur, e.g., if the camera doesn't have an OIS system, if there is object motion within the scene, and/or if there is significant camera shake during the long exposure image capture. Thus, for cameras that have an OIS system, exposure times could range up to the maximum threshold exposure time in low light environments, which would allow for the use of a small gain—and hence less noise. However, for cameras that do not have an OIS systems, the use of very long exposure times will likely result in motion blurred images, which is often undesirable. Thus, as may now be understood, a long exposure image's exposure time may not always be the maximum threshold exposure time allowed by the image capture device.

According to some embodiments, the incoming image stream may comprise a particular sequence and/or particular pattern of exposures. For example, according to some embodiments, the sequence of incoming images may comprise: EV0, EV−, EV0, EV−, and so forth. In other embodiments, the sequence of incoming images may comprise only EV0 images. In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence. The sequence of exposures may, e.g., continue in this fashion until a subsequent capture request is received, the camera(s) stop capturing images (e.g., when the user powers down the device or disables a camera application), and/or when one or more operating conditions may change. In still other embodiments, the image capture device may capture one or more additional EV0 images in response to the received capture request and then fuse the additional EV0 short exposure images (along with, optionally, one or more additional EV0 images captured prior to the received capture request, if so desired) into a synthetic long exposure image, as discussed above, which synthetic long image may then be treated as a single image for the purposes of the image fusion selection processes described herein. According to some embodiments, the images in the incoming image stream may be obtained as part of a preview operation of a device, or otherwise be obtained while the device's camera(s) are active, so that the camera may more quickly react to a user's capture request. Returning to the sequence of incoming images may ensure that the device's camera(s) are ready for the next capture request.

Returning to process 100, upon receipt of a capture request (Step 104), e.g., in the form of a user selection of a physical shutter capture button or other user interface element indicating the user's desire to capture a still image, the process may select two or more images from the incoming image stream for fusion (Step 106), including which image should serve as the reference image for the fusion operation and which image(s) will serve as the candidate image(s) that are registered to the reference image. The selection of which images from the incoming image stream to include in the image fusion operation may be based on one or more capture conditions associated with the respective images from the incoming image stream.

Next, at Step 108, the selected two or more images may be registered using any desired image registration method, e.g., global registration, local registration, dense optical flow, etc. As mentioned above, one of the selected images may be chosen to serve as the reference image of the registration process, and the other selected images may serve as the candidate images that are to be registered with the reference image. In some embodiments, the reference image may be chosen based on an exposure characteristic (e.g., using an EV− image as the reference image versus using an EV0 image as the reference image). In some embodiments, the reference image may be selected as the image captured closest in time to the capture request received from the user. In other cases, if the image captured closest in time to the capture request is not of a high enough quality (e.g., in terms of sharpness, noise, brightness, face confidence, etc.), then a second closest in time image may be selected as the reference image. In other embodiments, the sharpest image may serve as the reference image. In some such embodiments, the sharpest image may be determined by calculating a sharpness score for each image that is to be considered for the fusion operation. The sharpness score may be based on information in the respective image's metadata, e.g., the image's auto-focus score, the device's positional data during the capture of the respective image, OIS system data, etc. In some embodiments, images with below a threshold sharpness score may simply be excluded from fusion operations. If no image has greater than the threshold sharpness score, the device may determine that it is not possible to perform fusion operations for the given capture request. In other embodiments, the threshold sharpness score may be defined r relative to the sharpness score of the selected reference image (e.g., a threshold that is set to 50% of the sharpness score of the selected reference image, 75% of the sharpness score of the selected reference image, etc.).

Once the selected two or more images have been registered, they may be fused using any desired image fusion process (Step 110). As will be described in greater detail below with reference to FIGS. 1B and 1C, in some embodiments, the fusion process may comprise a generalized image fusion process that is based on minimizing a variance of the fused image estimate. One goal of such a fusion process is to cause candidate image pixels predicted to have less noise to have a bigger influence on the resulting value of the corresponding pixel in the resultant fused image, while causing candidate image pixels predicted to have more noise to have a smaller influence on the resulting value of the corresponding pixel in the resultant fused image. In some embodiments, an asymmetric distance measure may be used to determine whether (or to what extent) to include a pixel from a candidate image in the calculation of the resulting value of the corresponding pixel in the resultant fused image. In other embodiments, a similarity weight may be derived to further tune the extent to which a pixel from a candidate image influences the calculation of the resulting value of the corresponding pixel in the resultant fused image.

Next, according to some embodiments, one or more tone mapping operations, e.g., global and/or local tone mapping operations may be performed on the image subsequently to the fusion operation (Step 112).

At Step 114, any desired noise reduction may be applied to the fused image. (It is to be understood that, as indicated by the dashed lines in FIG. 1A, in some embodiments, the tone mapping and/or noise reduction steps may be optional.) As will be described in greater detail below with reference to FIGS. 1D and 1E, in some embodiments, the noise reduction may take into account the weighting determinations made by a generalized image fusion process (i.e., weights specifying the contributions of the various constituent images to the resultant fusion image), e.g., as performed in Step 110. One goal of such a fusion-adaptive noise reduction process may be to determine the amount of noise reduction to be applied to the pixels in the resultant fused image based, at least in part, on: 1.) the contributions of each constituent image at each pixel location in the result fused image; 2.) the respective estimated noise levels of the constituent images at each pixel location; and/or 3.) a "boosting factor" that may be determined for each constituent image, e.g., based on the respective constituent image's exposure settings, to provide additional tuning control for matching the noise and detail tradeoffs for a particular constituent image.

Finally, at Step 116, the resultant noise-reduced, fused image may optionally be stored in a memory and/or display on a display device. So long as the image capture device continues to obtain the incoming image stream (i.e., "YES" at Step 118), the process may return to Step 102 and continue operation. Once the image capture device has ceased to obtain the incoming image stream (i.e., "NO" at Step 118), e.g., in response to the user turning off the image capture device or closing the camera application, the process 100 may end.

In some embodiments, the same registration, fusion, and/or noise reduction techniques may be applied, regardless of which set of two or more images are selected from the incoming image stream. It is to be understood that certain steps illustrated in FIG. 1A may be performed in a different sequence than is illustrated. For example, the noise reduction techniques may be applied to the image data at any point in the image processing pipeline for which there exists a noise model or for which a noise model may be derived (e.g., with the image data in the RAW domain, after demosaicing, in 8-bit YCbCr, 10-bit YCbCr, etc.).

Figure 1B:
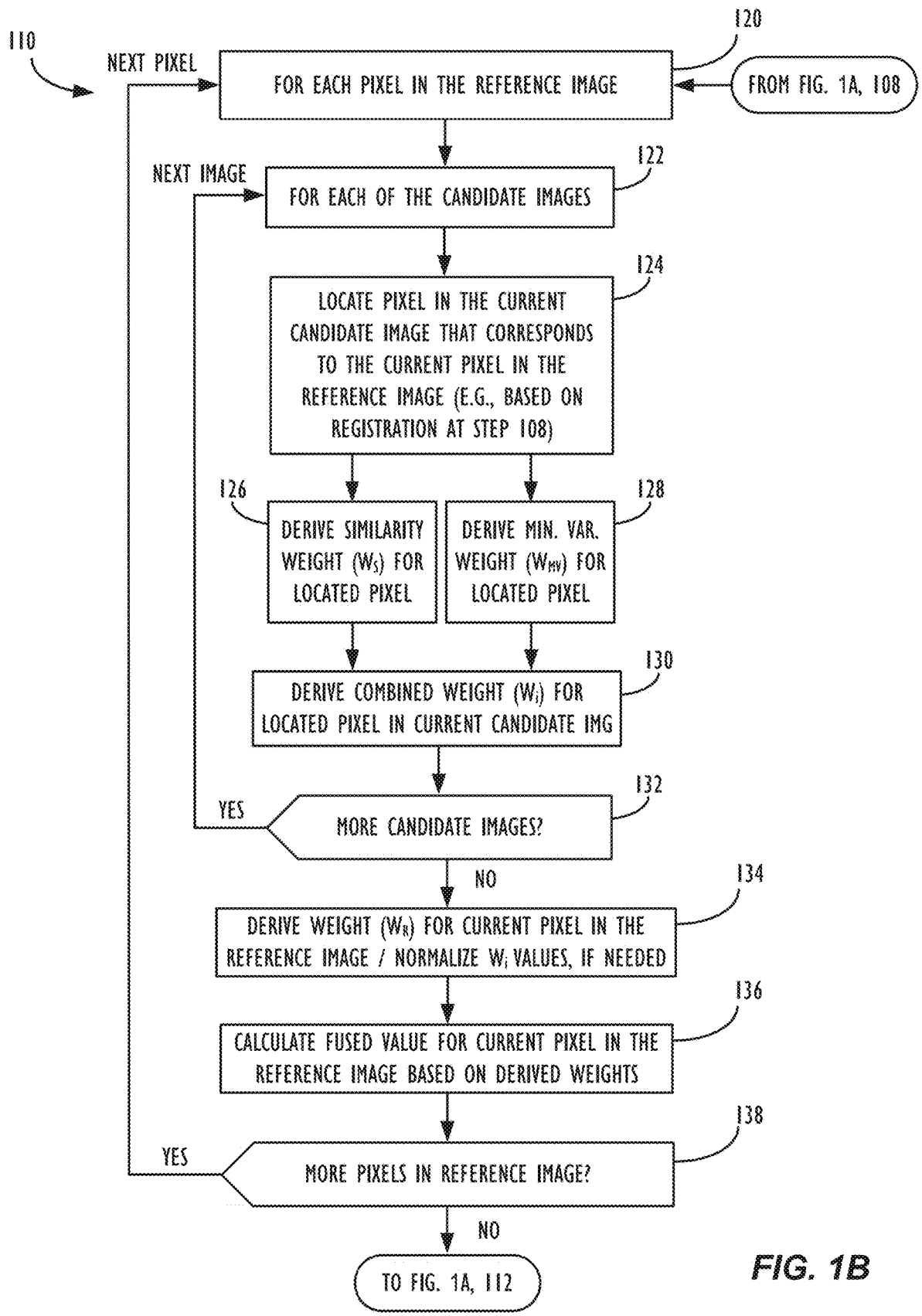
FIG. 1B is flow chart illustrating further details regarding a method of adaptively fusing images, according to one or more embodiments.

Referring now to FIG. 1B, a flow chart illustrating further details regarding a method of adaptively fusing images 110 is shown, according to one or more embodiments. First, for each pixel in the reference image, the corresponding pixel in each of the candidate images may be evaluated for its potential contributions to the fusion operation (Step 120). In particular, for each of the candidate images (Step 122), several evaluation steps may be taken. First, the corresponding pixel in the current candidate image may be located (Step 124). It is noted that, in some instances the location of the corresponding pixel in the current candidate image may come directly from the image registration step (e.g., Step 108 in FIG. 1A). However, in some instances, e.g., in cases where there is local motion within an image, a registration algorithm may not successfully match each pixel in the reference image with the true corresponding pixel in a candidate image. In such instances, the process may search a neighborhood around the pixel location identified by the image registration algorithm (e.g., a 3×3 pixel neighborhood, a 5×5 pixel neighborhood, etc.) to see if a better matching corresponding pixel may be located. Once the corresponding pixel has been located in the current candidate image for the current pixel of the reference image that is being evaluated, the process may derive one or more weights for the corresponding pixel from the candidate image, wherein the weights are reflective of the influence the corresponding pixel will have in the calculation of the pixel value for the current reference image pixel in the resultant fused image.

According to some embodiments, a similarity weight ($w_s$) may be derived for the located pixel in the current candidate image (Step 126). According to some embodiments, the similarity weight may be based on the evaluation of a distance measure. In some embodiments, the similarity weight may reflect a binary determination that drives the inclusion (or exclusion) of the located pixel from participation in the image fusion process, e.g., a candidate image pixel receives a similarity weight of '1' and is included in the fusion process if its value is within a similar pixel threshold of the corresponding reference image pixel, and the candidate image pixel receives a similarity weight of '0' and is excluded from the fusion process if its value is not within the similar pixel threshold of the corresponding reference image pixel.

Most distance measures are said to be "symmetric," that is, the distance value would not change if the reference image and candidate image pixels were interchanged. An example of symmetric distance measure is:

$$AD = |x_r - x_i| \quad \text{(Eqn. 1),}$$

where $x_r$ and $x_i$ are, respectively, pixel values of the reference image and a candidate image, and AD is the absolute difference between their respective values.

In some embodiments, a candidate pixel would be considered "similar" to the reference pixel if the distance measure is less than or equal to a similar pixel threshold value, e.g.:

$$|x_r - x_i| \leq X\sigma_r \quad \text{(Eqn. 2).}$$

Here, X is a tuning parameter that controls the tradeoff between de-ghosting, edge preservation, and noise reduction, and $\sigma_r$ is an estimated noise at the reference pixel. [In other embodiments, $\sigma_i$, i.e., an estimated noise at the candidate pixel may also be taken into account when determining the similar pixel threshold, e.g., using a similar pixel threshold, such as: $|x_r - x_i| \leq X(\sigma_r + \sigma_i)$ (Eqn. 2B).] A higher value of X will relax the similar pixel threshold and improve noise reduction, but increase the risk of including dissimilar pixels into the similar pixel set, which can result in so-called 'ghosts' in the resultant fused image.

Asymmetric Distance Measure

Often times, the value of X may be tuned for a given implementation to find the similar pixel threshold that gives the best noise reduction performance across the range of potential image light levels, such that the output image has no ghosts. A disadvantage of this strategy is that increased noise reduction often results in increased ghosting artifacts.

Thus, according to other embodiments, a so-called 'asymmetric distance measure' may be employed when determining the optimal similarity weight for a given candidate pixel. According to some such embodiments, incorporating additional information within the distance measure may allow for a reduction in the likelihood of classifying a corresponding dissimilar pixel as similar, as well as classifying a similar pixel as dissimilar. For example, additional information regarding whether a pixel is part of an edge within the image may be used to asymmetrically modulate the distance measure. In particular, if it is determined that the corresponding pixel in the candidate image has more edge response than the reference pixel, it is very likely that fusing the candidate pixel into the resultant fused image will be introducing a ghost. Similarly, if the corresponding pixel in the candidate image has less edge response than the reference pixel, it is more likely that fusing the candidate pixel into the resultant fused image will in fact result in a desired noise reduction. Thus, as shown below, the absolute difference (AD) distance measure, when modulated with asymmetric edge information, may be represented as:

$$AD_{asym} = |x_r - x_i|(1 + \alpha 1_{E_i > E_r}) \quad \text{(Eqn. 3),}$$

where $E_r$ and $E_i$ are, respectively, the edge responses of the reference pixel and the corresponding pixel from the ith candidate image, 1 is an indicator function, and a (i.e., "alpha") is a tuning parameter that controls the amount of asymmetric distance that is to be added. Edge responses ($E_r$ and $E_i$) can be based on horizontal and vertical gradients or more noise-robust operators, such as Sobel, Difference of Gaussian, or Laplacian of Gaussian (LoG) kernels. Tuning parameter a may be varied with exposure level to provide a light-dependent tradeoff between ghosting and noise reduction. Tuning parameters X and/or a could also vary locally based on information regarding the presence of high-level features (e.g., content-based features) within the image, such as the presence of a face, where even small ghosts are objectionable. Without loss of generality, this notion may be extended to other distance measures. For example, an asymmetric Sum of Absolute Difference (SAD) distance measure can be written in terms of symmetric SAD as:

$$SAD_{asym} = SAD(1 + \alpha 1_{E_i \neq E_r}) \quad \text{(Eqn. 4)}.$$

In the context of Eqns. 3 and 4, the asymmetric distance measures may still be compared to some form of pixel similarity threshold (e.g., $X_{AD}\sigma_r$, where, again, $X_{AD}$ is a tuning parameter), and then the similarity weight may be set to '1' (i.e., including the pixel in the fusion process) if the asymmetric distance measure is less than the pixel similarity threshold or set to '0' (i.e., excluding the pixel in the fusion process) if the asymmetric distance measure is greater than or equal to the pixel similarity threshold.

In still other embodiments, rather than providing a binary similarity weight (e.g., either a value of '0' or '1'), the similarity weight value may further comprise a continuous weight, i.e., a weight that provides for a tunable amount of inclusion or influence of a given candidate image pixel to the fusion process, e.g., based on a determined degree of similarity between the given candidate image pixel and the corresponding reference image pixel. In some embodiments, this similarity weight value may fall in the range of 0 to 1, for ease of implementation. Thus, rather than completely discarding a corresponding pixel from a candidate image that does not meet a pixel similarity threshold (e.g., by setting its similarity weight to '0'), the process may simply lower its similarity weight value to where it does not have a large influence on the pixel value in the resultant fused image, but it still provides at least some contribution to the resultant fused image (e.g., by setting its similarity weight to '0.1'). In cases where a continuous similarity weight (or other pixel weights) are used, it may be necessary or desirable to further normalize the fused estimate for a given output pixel by the sum of the various weights used in calculating the given output pixel's fused estimate value, as will be discussed in more detail below, with reference to Eqns. 5-8.

Once the decision has been made whether (or to what extent) to include a candidate pixel in the fusion operation in Step 126, the process may then (or in parallel with the determination of Step 126) also derive a "minimum variance fusion weight" for the located pixel from the current candidate image (Step 128), which will now be described in further detail.

Minimum Variance Fusion Weights

In some forms of image fusion, e.g., those wherein all of the images being fused have the same (or similar) exposure settings, it may be assumed that the noise level in similar pixels will be equal to the noise level of the reference pixel. So, the pixel signal information may be modeled as: $x_i = x + n_i$, where $x_i$ is observed data (e.g., in the similar pixels to be fused), x is the unknown true value of the pixel signal information, and $n_i$ is a zero mean, independent and identically distributed (iid) noise component with a standard deviation, G. Since the noise level, a, for all deemed similar pixels is assumed to be the same, the fused estimate for the output pixel may be represented as:

$$\hat{x} = \frac{1}{M} \sum_{i=1}^{M} x_i, \quad \text{(Eqn. 5)}$$

where M is the number of similar pixels (e.g., including up to N similar pixels from N candidate images and the pixel from the reference image itself). In other words, similar pixels and the reference pixel are given equal weight in the fused estimate. However, in reality, the noise level at similar pixels may be similar—but not necessarily equal—to the noise of the reference pixel. In some capture modes, the constituent images may comprise images with widely varying noise levels, e.g., EV− images, EV0 images, EV+ images, or any number of other long exposure images or short exposure images, as discussed above.

In some cases, boosting techniques may be used to determine fusion weights that automatically adjust to images with varying noise levels. Boosting may be used to combine several weak classifiers, whose combined performance is significantly better than that of any of the individual classifiers. Each classifier contributes to the final outcome. In estimation problems, such as noise reduction and fusion, each similar pixel from a candidate image can be considered as a weak estimate of the true value of the pixel.

Thus, according to some embodiments, these various weak estimates may be combined into a more robust combination via the usage of adaptive weights for the various signal estimates the process has obtained. In image fusion, the impact of adaptive weights may help provide a more accurate representation of the true signal.

According to some embodiments, the goal will be find weights, $w_i$, such that the fused pixel estimate, which may be represented as:

$$\hat{x} = \sum_{i=1}^{M} w_i x_i, \quad \text{(Eqn. 6)}$$

wherein x is the true value for the given fused pixel estimate, $\hat{x}$ is a random variable with mean, E(2)=x, and wherein the variance of the fused pixel estimate, which may be represented as:

$$\sigma_{\hat{x}}^2 = \sum_{i=1}^{M} w_i^2 \sigma_i^2, \quad \text{(Eqn. 7)}$$

is minimized, subject to the constraint that $w_i > 0$ and $$\sum_{i=1}^{M} w_i = 1. \quad \text{(Eqn. 8)}$$

(In some embodiments, the weights, $w_i$, will also be referred to herein as "combined weights," for reasons which will be explained in further detail below). Since weights, $w_i$, are defined as being non-negative, the fused estimate may be represented as a convex combination of the reference pixel value and the similar pixel values at corresponding locations in candidate images. To solve this constrained minimization problem with an equality constraint, a Lagrange multiplier may be used with the following Lagrangian:

$$\mathcal{L}(w_1, \ldots, w_M, \lambda) = (w_1^2 \sigma_1^2 + \ldots + w_M^2 \sigma_M^2) - \lambda(w_1 + \ldots, w_M - 1) \quad \text{(Eqn. 9)},$$

where λ is the Lagrange multiplier.

The Lagrangian is minimized if:

$$\nabla_{w_1, \ldots, w_M, \lambda} \mathcal{L}(w_1, \ldots, w_M, \lambda) = 0 \quad \text{(Eqn. 10)}.$$

The derivative of the Lagrangian with-respect-to each variable yields N+1 equations:

$$\frac{\partial}{\partial \lambda} \mathcal{L}(w_1, \ldots, w_M, \lambda) = w_1 + \ldots + w_M - 1 = 0 \quad \text{(Eqn. 11)}$$

$$\frac{\partial}{\partial w_1} \mathcal{L}(w_1, \ldots, w_M, \lambda) = 2 w_1 \sigma_1^2 - \lambda = 0 \quad \text{(Eqn. 12)}$$

...

$$\frac{\partial}{\partial w_M} \mathcal{L}(w_1, \ldots, w_M, \lambda) = 2 w_M \sigma_M^2 - \lambda = 0 \quad \text{(Eqn. 13)}$$

In a compact form, that may be rewritten as:

$$w_i = \frac{\lambda}{2\sigma_i^2}, \quad \text{(Eqn. 14)}$$

and the Lagrange multiplier, $\lambda$, can be found by substituting Eqn. 14 into Eqn. 8, resulting in the following:

$$\frac{\lambda}{2} = \frac{1}{\frac{1}{\sigma_1^2} + \ldots + \frac{1}{\sigma_M^2}}. \quad \text{(Eqn. 15)}$$

As may now be understood, Eqn. 14 provides the weight values that will minimize the variance of the fused estimate for a given pixel (hence the name, "minimum variance fusion weights"). As reflected in Eqn. 14, the weight for each similar pixel is directly related to the reciprocal of the estimate of the noise variance ($\sigma^2$) at that pixel. This relationship implies that pixels with less noise will have a bigger influence/contribution to the fused estimate for the given pixel in the resultant fused image, while pixels with more noise will have a relatively smaller influence/contribution to the fused estimate for the given pixel in the resultant fused image. Finally, it is noted that the minimum variance formulation would work for any type of noise distribution, e.g., Gaussian, Poisson, Skellam, etc.

As mentioned above, in prior approaches, the main parameter used to balance edge preservation, noise reduction, and de-ghosting within the fusion framework was the parameter X, as described in Eqn. 2, above. That is, a higher value of X relaxes the pixel similarity threshold, thereby increasing the chances of fusing more pixels from candidate image and increasing the potential for noise reduction. By contrast, a lower value of X may have the effect of freezing motion better and resulting in fewer ghosting artifacts, but such benefits may come at the cost of additional noise.

To avoid excessive amounts of ghosting, in images of motion-heavy scenes, a conservative (i.e., lower) value may be chosen for X. This results in less noise in static areas of the scene and more noise in dynamic areas of the scene.

The tuning parameter, a, described above in reference to the asymmetric distance measure of Eqn. 3, may then be used to help mitigate the presence of ghosting artifacts without unduly increasing residual noise, thus providing another parameter for tuning or modification that may allow an implementation to achieve a better de-ghosting versus noise reduction tradeoff. As may now be appreciated, the use of minimum variance fusion weights may help to deal with the fusion of an arbitrary number of input images with varying noise levels. More particularly, by utilizing a minimum variance fusion weighting scheme, such as that described herein, the weights will provide an estimate that is optimal from a variance minimization standpoint. Moreover, by utilizing an asymmetric distance measure, the fused estimate may also result in fewer ghosting artifacts.

At Step 130, according to some embodiments, a single, e.g., "combined" weight ($w_i$) may be derived for the located pixel in the current candidate image. For example, in some embodiments, the combined weight may simply comprise a multiplication of the derived minimum variance fusion weight ($w_{mv}$) for the located pixel with the derived similarity weight ($w_s$) of the located pixel. In other words, for a given candidate image pixel that is to be included in the fusion estimate, the candidate image pixel's combined weight ($w_i$) may be represented as: $w_i = w_s * w_{mv}$ (Eqn. 16). It is to be understood that, in some cases, e.g., where the combined weights, are constrained to be non-negative and sum to 1, and when only similar pixels (i.e., those with $w_s = 1$) are considered in the fusion operation, then the convex constraint that the combined weights must sum to 1 is effectively enforced on the minimum variance fusion weights, $w_{mv}$, of the contributing pixels.

In other embodiments, additional weights, different weights, and/or fewer weights may be utilized and combined in any desired fashion to derive the combined weight value, $w_i$, of the candidate image pixel.

Next, at Step 132, if there are more candidate images to consider (i.e., "YES" at Step 132), the process may return to Step 122 to evaluate the next candidate image, i.e., locate the pixel in the next candidate image that corresponds to the current pixel in the reference image, and then derive the appropriate weight for the located pixel in the next candidate image, as shown in Steps 124-130. In some embodiments, the process 110 may be able to independently derive the combined weight value ($w_i$) for a located pixel in each candidate image without a priori knowledge of (or evaluation of) the other candidate images (as is shown in the loop of Steps 124-130 of FIG. 1B). However, in other embodiments, the process may instead iterate through all the candidate images, locate the corresponding pixel in each respective candidate image, and obtain a noise variance estimate for the located corresponding pixel (e.g., from a predetermined or derived noise model), calculate and "un-normalized" combined weight value (e.g., as shown in Eqn. 14), and separately accumulate a sum of all the calculated un-normalized combined weight values. Then, once all the corresponding candidate image pixels and their respective noise variance estimates have been obtained, the final combined weights ($w_i$) may be derived for each of the located corresponding pixels from the candidate images, e.g., by normalizing each of the calculated un-normalized combined weight values by dividing by the accumulated sum of all the calculated un-normalized combined weight values. Once there are no further candidate images to consider (i.e., "NO" at Step 132), the process may proceed to Step 134.

At Step 134, a weight ($w_r$) for the current pixel in the reference image may be obtained. The weight for the reference image pixel ($w_r$) may be obtained in a similar manner as the derived combined weights ($w_i$) for the other candidate image pixels, as described above with reference to Steps 126-130. In other words, a minimum variance fusion weight ($w_{mv}$) and similarity weight ($w_s$) may be derived for the reference pixel and combined in any desired fashion to end up with the final combined reference pixel weight ($w_r$). In other embodiments, different types or sets of weights may be used to derive the reference pixel's weight. For example, the concept of the similarity weight ($w_s$) factor may not be relevant for a reference pixel (since its value would just be compared to itself, according to Eqns. 1-4), or the similarity weight may always be set to '1,' or some other predetermined value. In some embodiments, the minimum variance fusion weight ($w_{mv}$) alone may be used as the weight for the reference pixel.

As mentioned above, the calculated combined weights ($w_i$) for the candidate pixels at a given reference pixel location may also need to be normalized at Step 134 (e.g., in cases where the final combined weight value, $w_i$, for a given candidate image pixel depends on knowing the values of the noise variance estimates for each of the other contributing candidate pixels) before moving on to calculate the fused value for the current pixel in the reference image at Step 136.

Once the set of corresponding pixels from candidate images that are deemed sufficiently similar to the reference pixel to contribute to the resultant fused image have been identified (e.g., the set of candidate image pixels from each candidate image with non-zero combined weights), they may be combined with the corresponding pixel from the reference image, e.g., according to the derived combined (and, optionally normalized) candidate pixel weights and the reference pixel weight from Steps 130 and 134, to get the final fused pixel estimate (Step 136). According to some embodiments, the calculated fused value for a given pixel in the resultant fused image may be a simple weighted sum of the reference pixel and contributing candidate image pixels, e.g.:

$$\hat{x} = \sum_{i=1}^{M} x_i w_i, \quad \text{(Eqn. 17)}$$

where M is the total number of images involved in the fusion calculation, e.g., including the reference image and the maximum of N candidate images, $x_i$ is the value of the given pixel in the $i^{th}$ constituent image, and $w_i$ is the combined weight value of the given pixel in the $i^{th}$ constituent image. In embodiments where a continuous or non-binary similarity weight ($w_s$) is used in the calculation of the combined weight values ($w_i$), e.g., resulting in a situation where the sum of the combined weight values ($w_i$) does not equal to 1 for the M contributing pixels, it may be beneficial to further normalize the combined weight values ($w_i$) used in Eqn. 17. For example, the combined weight values ($w_i$) may be normalized by dividing each by the sum of: the similarity weights multiplied by the respective minimum variance weights, for all pixels contributing to the resultant fused value of a given pixel.

Next, at Step 138, so long as there are more pixels in the reference image to obtain fusion estimates for (i.e., "YES" at Step 138), the process may return to Step 120, and repeat the evaluation process of Steps 122-136 and obtain a pixel fusion estimate for the next pixel in the reference image. When there are no further pixels in the reference image to obtain fusion estimates for (i.e., "NO" at Step 138), the fusion operation is complete, and the process may return to Step 112 of FIG. 1A to resume the execution of process 100. As may now be understood, the set of calculated fused pixel values at Step 136 (i.e., a fused value corresponding to each pixel in the reference image) will thus comprise the set of pixel values specifying the resultant fused image.

Figure 1C:
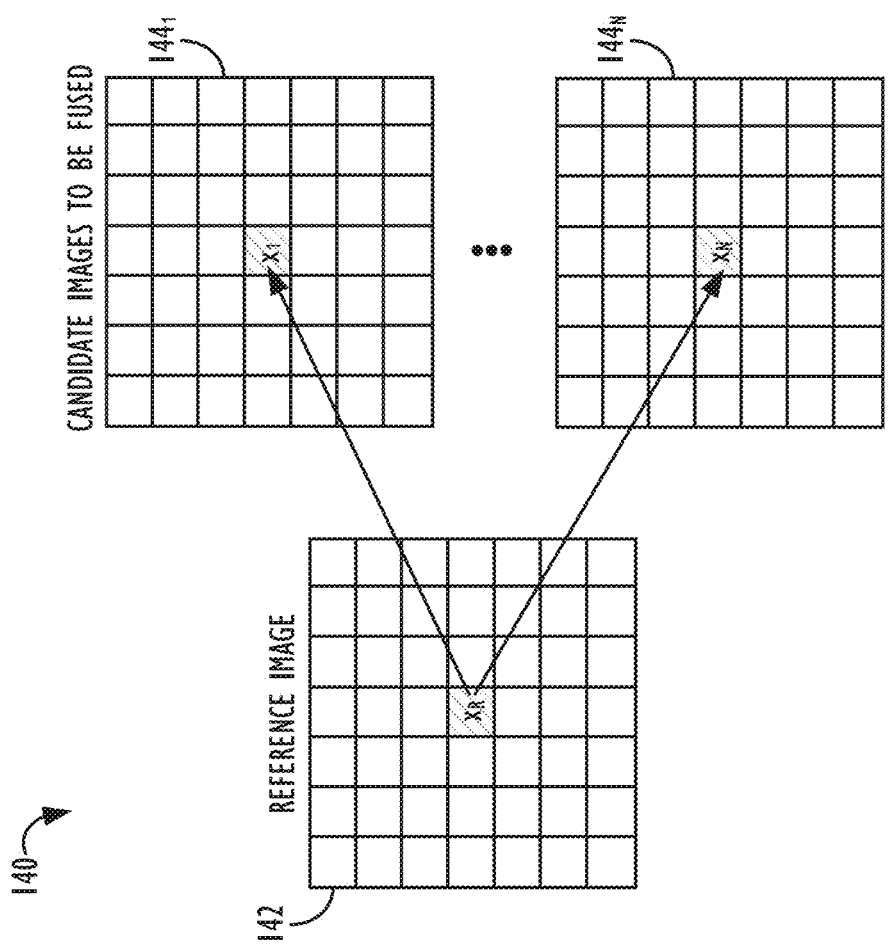
FIG. 1C illustrates various examples of reference image pixels, candidate image pixels, and various exemplary equations that may be used to perform adaptive image fusion, according to one or more embodiments.

Referring now to FIG. 1C, various examples of reference image pixels 142, candidate image pixels 144, and various exemplary equations (145-149) that may be used to perform adaptive image fusion are shown, according to one or more embodiments.

As is illustrated in reference image 142, the various squares represent individual pixels in the reference image, and the pixel labeled $x_r$ represents a particular pixel from the reference image for which corresponding pixels in candidate images 144 have been located. For example, pixel $x_1$ in candidate image $144_1$ corresponds to reference pixel $x_r$, just as pixel $x_n$ in candidate image $144_n$ also corresponds to reference pixel $x_r$. As may be understood, the application of a global and/or local registration algorithm to the reference image and one of the candidate images will provide a location of the corresponding pixel in the candidate image for each pixel in the reference image. Of course, registration algorithms may not be able to account for internal frame motion (e.g., the movement of facial features within the face of a person who is not otherwise moving from the capture of one image to the next). Thus, as mentioned above, in some embodiments, a small neighborhood of pixels around the location of the corresponding candidate pixel located by the registration algorithm may also be searched to see if a better matching pixel may be identified. If no better matching pixel may be identified in the surrounding neighborhood, then there may be a "true" dissimilarity in the pixel value between the reference image and the corresponding pixel located in the candidate image, and the results of the registration algorithm may simply be used, with the understanding that the located corresponding pixel in the candidate image may not pass the similar pixel threshold test, depending on how strictly it has been tuned.

Fusion-Adaptive Noise Reduction

Figure 1D:
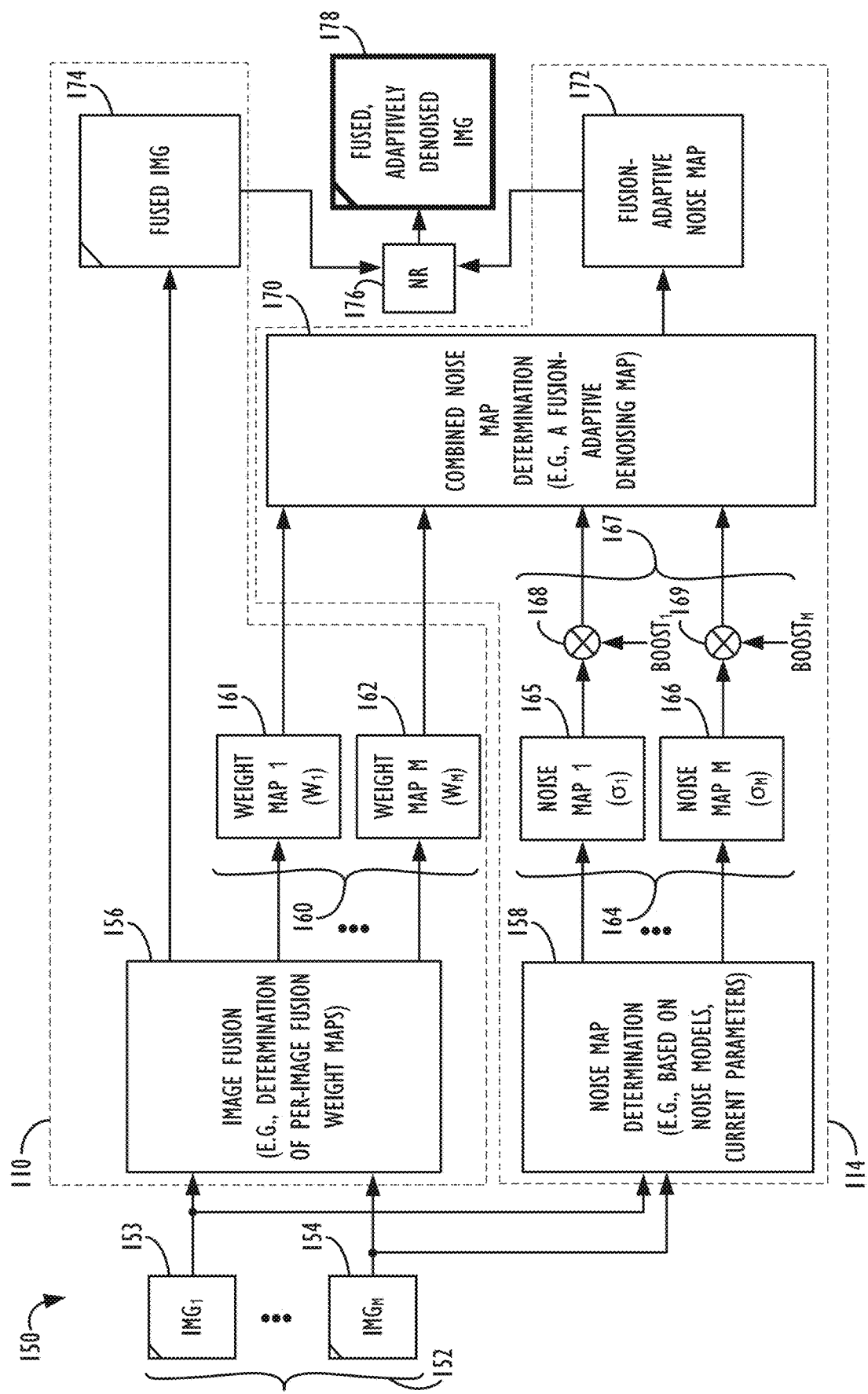
FIG. 1D is a process flow diagram illustrating a method of performing fusion-adaptive noise reduction, according to one or more embodiments.

Referring now to FIG. 1D, a process flow diagram illustrating a method of performing fusion-adaptive noise reduction 150 is shown, according to one or more embodiments. Starting at the left of FIG. 1D, the various constituent images 152 that will be used in the image fusion and noise reduction processes are illustrated. Constituent images 152 may comprise the images labeled $IMG_1$ (153) all the way up to $IMG_M$ (154). In some embodiments, these M constituent images may comprise a reference image and N additional candidate images, as described above. The number, N, of candidate images may range from one all the way up to the maximum number of images the system has at its disposal to consider.

Constituent images 152 may be processed by two parts of the processing pipeline for performing fusion-adaptive noise reduction 150 in sequence (or at least partially in parallel). First, constituent images 152 may be passed to image fusion module 156, which as described above, e.g., with reference to FIGS. 1B and 1C, may generate individual weights for each pixel in each candidate image that will be contributing to the fusion operation. The sets of derived pixel weights for a given candidate image (or reference image) may also be referred to herein as a weight map (160). As illustrated, the weight maps produced by image fusion module 156 may comprise M different weight maps (e.g., where M may=N+1, and there is a weight map for each of N candidate images and 1 reference image), including a weight map corresponding to $IMG_1$ (161) all the way up to a weight map corresponding to $IMG_M$ (162). As described above, e.g., with reference to FIGS. 1B and 1C, the application of the derived weight maps to the input image data will result in fused image 174. As also described above, in some embodiments described herein, the weights may be derived to minimize the amount of variance in the resulting fused image 174.

After obtaining the weight maps 160 (or at least partially in parallel with the process of obtaining the weight maps 160), the constituent images 152 may also be passed to noise map determination module 158, whose function will be described in further detail below. Noise map determination module 158 may be utilized to determine a noise estimate for each pixel in each constituent image, e.g., based on predetermined noise models for input images with particular exposure settings and/or camera parameters associated with the capture of the respective constituent images (e.g., gain level). In other embodiments, e.g., wherein the noise model for a particular constituent image is not already stored, the noise model may be derived (e.g., using color capture chart calibrations and/or physical modeling of the image processor and associated circuitry's thermal and electronic characteristics) and/or adapted from one or more other noise models that are already stored (e.g. via an interpolation or blending process between two or more existing noise models).

The sets of pixel noise variance estimates for a given candidate image may also be referred to herein as a noise map (164). As illustrated, the noise maps produced by noise map determination module 158 may comprise M different noise maps (e.g., where M=N+1, and there is a noise map for each of N candidate images and 1 reference image), including a noise map corresponding to $IMG_1$ (165) all the way up to a noise map corresponding to $IMG_M$ (166). Next, if so desired, a boost factor may be applied to each noise map. According to some embodiments, and as will be explained in greater detail below, the boost factor may be a separate multiplier applied to each noise map, wherein the magnitude of a boost factor may be based on the relative expected noise levels of the respective constituent image. For example, as illustrated, a first boost factor (168) may be applied to the noise map corresponding to $IMG_1$, and additional (e.g., distinct) boost factors may be applied to the other constituent images, all the way up to a $m^{th}$ boost factor (169) that may be applied to the noise map corresponding to $IMG_M$.

Next, a combined noise map determination module 170 may take the boosted noise maps 167 (e.g., resulting from the application of boost factors 168 . . . 169) and further combine them with the information contained in weight maps 160 obtained from the image fusion module 156 to produce a more accurate fusion adaptive noise map 172. Exemplary methods by which the fusion weight maps 160 may be combined with the boosted noise maps 164 will be described in further detail below.

Finally, the fused image 174 may have noise reduction 176 applied to it according to the fusion-adaptive noise map 172, resulting in fused, adaptively denoised image 178. In some embodiments, this application of noise reduction 176 may comprise iterating through the fused image 174 in a pixel-by-pixel fashion, looking up the corresponding entry for the pixel in the fusion-adaptive noise map 172, and then applying the specified amount of noise reduction to the pixel and storing the resultant output value, e.g., in the corresponding pixel location of an output buffer, which process, when completed, will represent the set of final fused pixel values for the resultant fused, adaptively denoised image 178.

As may now be appreciated, the dashed line 110 indicates the portions of the fusion-adaptive noise reduction processing pipeline 150 corresponding to the image fusion step 110 of FIG. 1A, and the dashed line 114 indicates the portions of the fusion-adaptive noise reduction processing pipeline 150 corresponding to the noise reduction step 114 of FIG. 1A. The resultant fused, adaptively denoised image 178 may then be stored and/or displayed, as is desired by a given implementation.

Figure 1E:
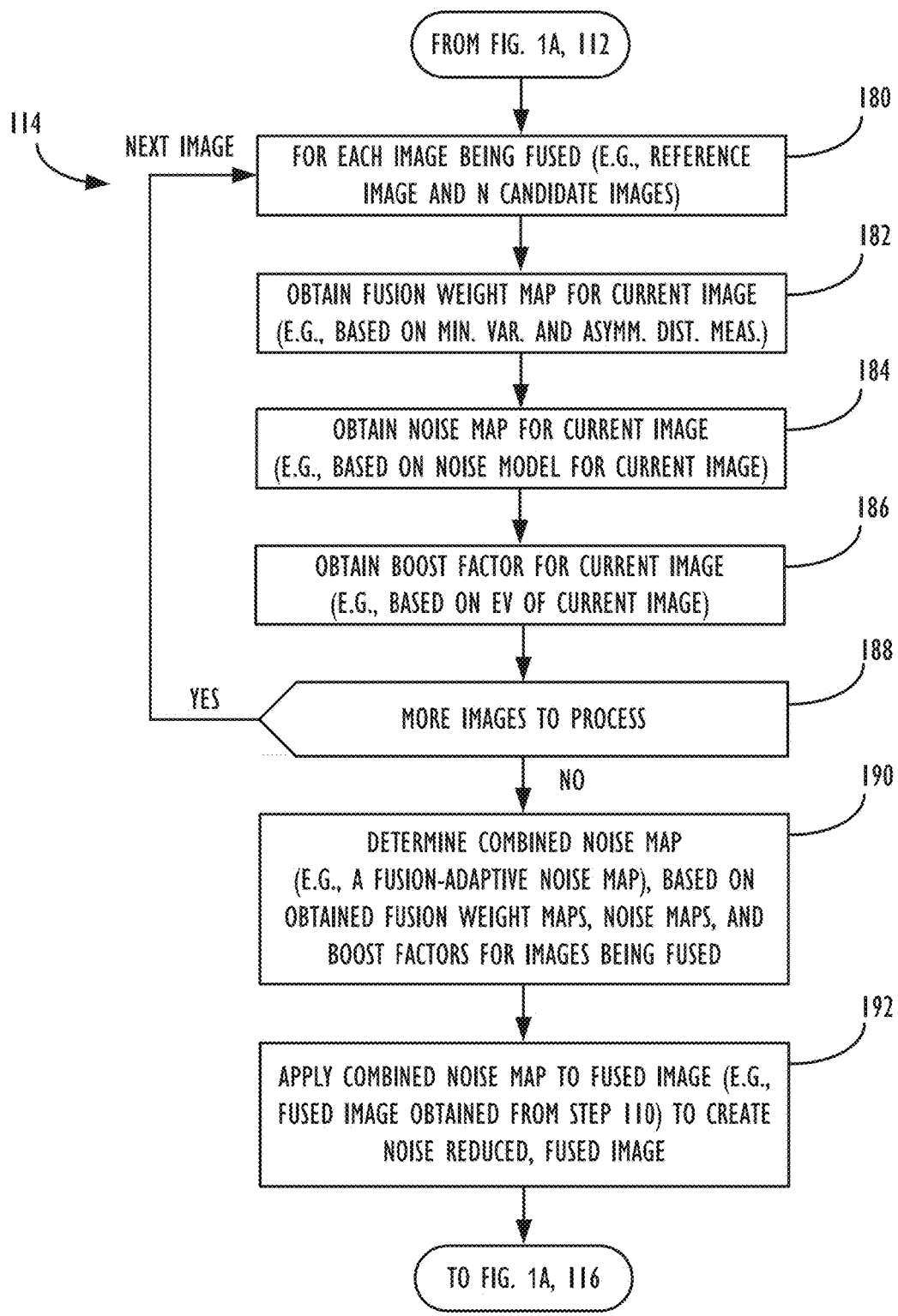
FIG. 1E is flow chart illustrating further details regarding a method of performing fusion-adaptive noise reduction, according to one or more embodiments.

Referring now to FIG. 1E, a flow chart illustrating further details regarding a method of performing fusion-adaptive noise reduction 114 is shown, according to one or more embodiments. First, for each constituent image being used in the fusion operation (Step 180), the following information may be obtained: a fusion weight map for the image (Step 182), a noise map for the image (Step 184); and a boost factor for the image (Step 186). So long as there are more images to process (i.e., "YES" at Step 188), the process may return to Step 180 to continue to obtain the relevant information for each constituent image that is being fused.

As mentioned above, e.g., with reference to FIGS. 1B and 1C, the images being fused may comprise a reference image and N additional candidate images that have been registered with respect to the reference image. At Step 182, as also discussed above with reference to FIGS. 1B and 1C, the fusion weight map may comprise a combined fusion weight value for each pixel in the respective constituent image. These combined fusion weights may be based on a similarity weight, a minimum variance fusion weight, or whatever other combination of weighting factors are desired for a given implementation. The distance measure used to compare the similarity of a pixel from a reference image with a corresponding pixel form a candidate image may, in some instances, comprise an asymmetric distance measure, as also discussed above. At Step 184, the noise map may comprise an indication of how much noise is estimated to be present in each pixel in the respective constituent image. The noise map may be based on any desired noise model that the noise reduction process has access to (e.g., a predetermined or derived noise model), one or more parameters associated with the capture of the respective constituent image, and/or whatever other combination of factors are desired for a given implementation. In some embodiments, the noise model for a given constituent image may be based, at least in part, on the respective exposure setting for the given constituent image (e.g., EV−, EV0, EV+2, etc.). At Step 186, a boost factor may be applied to each constituent image, if so desired. As used herein, the boost factor, $b_i$, is an additional tuning parameter that may be used to further modify the noise model for a given constituent image. For example, the boost factor may be used to account for the differences in the various noise models that are used for images of different exposure values, as will be explained in greater detail with reference to FIGS. 3A and 3B. In some instances, the boost factor may be used to attempt to tune the noise reduction algorithm so that the constituent images will exhibit better matching, e.g., in terms of their noise characteristics and amount of details (i.e., the amount of pixel intensity variation within a given structure or object in the image). For example, in some embodiments, the boost factor may be used to apply even greater amounts of noise reduction to underexposed constituent images (e.g., EV−, EV−2, EV−3, etc.). This may also help to prevent undesirable noise reduction-related artifacts in the resultant fused image, e.g., the appearance of shadowy border regions with higher noise that may develop along the boundaries between regions of the resultant fused image that are more heavily influenced by an EV0 image (or an overexposed image, e.g., EV+, EV+2, EV+3, etc.) and regions of the resultant fused image that are more heavily influenced by an underexposed image (e.g., EV−, EV−2, EV−3, etc.).

As may now be understood, the boost factor ($b_i$) for a given constituent image may be based on a predetermined factor (e.g., exposure setting) and/or based on any number of other desired factors in real-time, i.e., so that the boost factor values wouldn't necessarily have to be the same for all constituent images sharing the same exposure setting (e.g., all EV− images). For example, the boost factor for a given constituent image may be based on any combination of: the EV level of the constituent image, scene content (e.g., the presence of faces, type of scene, or other objects in the scene), scene segmentation, and/or preferences of the tuner for a given implementation. Further, in some embodiments, the boost factor within a given constituent image may be spatially-varying/locally-varying based on one or more factors, e.g., scene content (e.g., the presence of faces, type of scene, or other objects in the scene), scene segmentation, and/or preferences of the tuner for a given implementation.

When there are no more images to process (i.e., "NO" at Step 188), the process may proceed to Step 190 to determine a combined noise map for the fusion operation. According to some embodiments, the combined noise map comprises a fusion-adaptive noise map. The fusion-adaptive noise map may be based on, e.g., the aforementioned obtained fusion weight maps for each constituent image (e.g., from Step 182), the obtained noise maps for each constituent image (e.g., from Step 184), and the determined boosting factors for each constituent image (e.g., from Step 186). [The combined noise map generated at Step 190 is also illustrated in element 172 of FIG. 1D.]

According to some embodiments, the values within the combined noise map may be determined according to the following equation:

$$\hat{\sigma} = \sqrt{\sum_{i=1}^{M} w_i^2 b_i^2 \sigma_i^2}, \quad \text{(Eqn. 18)}$$

where $w_i$ is the fusion-adaptive weight determined at a given pixel location for the $i^{th}$ image being used in the fusion operation, $b_i$ is the boosting factor determined at the given pixel location for the $i^{th}$ image being used in the fusion operation, and $\sigma_i^2$ is the estimated noise variance at the given pixel location for the $i^{th}$ image being used in the fusion operation.

Once the values for the combined noise map have been determined, the process may proceed to Step 192 to apply the combined noise map to the fused image (e.g., the fused image obtained from Step 110 of FIG. 1A). The values specified in the combined noise map comprise parameters used to drive any desired noise reduction method. For example, in some embodiments, a gradient-directed noise reduction approach may be preferred. In other embodiments, patch-based noise reduction, transformed domain noise reduction, and/or dictionary-based noise reduction (as well as their respective multi-resolution variations) may be used. In some embodiments, larger values in the combined noise map may comprise an indication that a greater amount of noise reduction needs to be applied to a given pixel, and smaller values in the combined noise map may comprise an indication that a lesser amount of noise reduction needs to be applied to a given pixel. Once the desired noise reduction process has been applied to the image data in accordance with the combined noise map, process flow may return to Step 116 of FIG. 1A. [The noise-reduced, fused image generated at Step 192 is also illustrated in element 178 of FIG. 1D.]

Exemplary Incoming Image Stream

Figure 2:
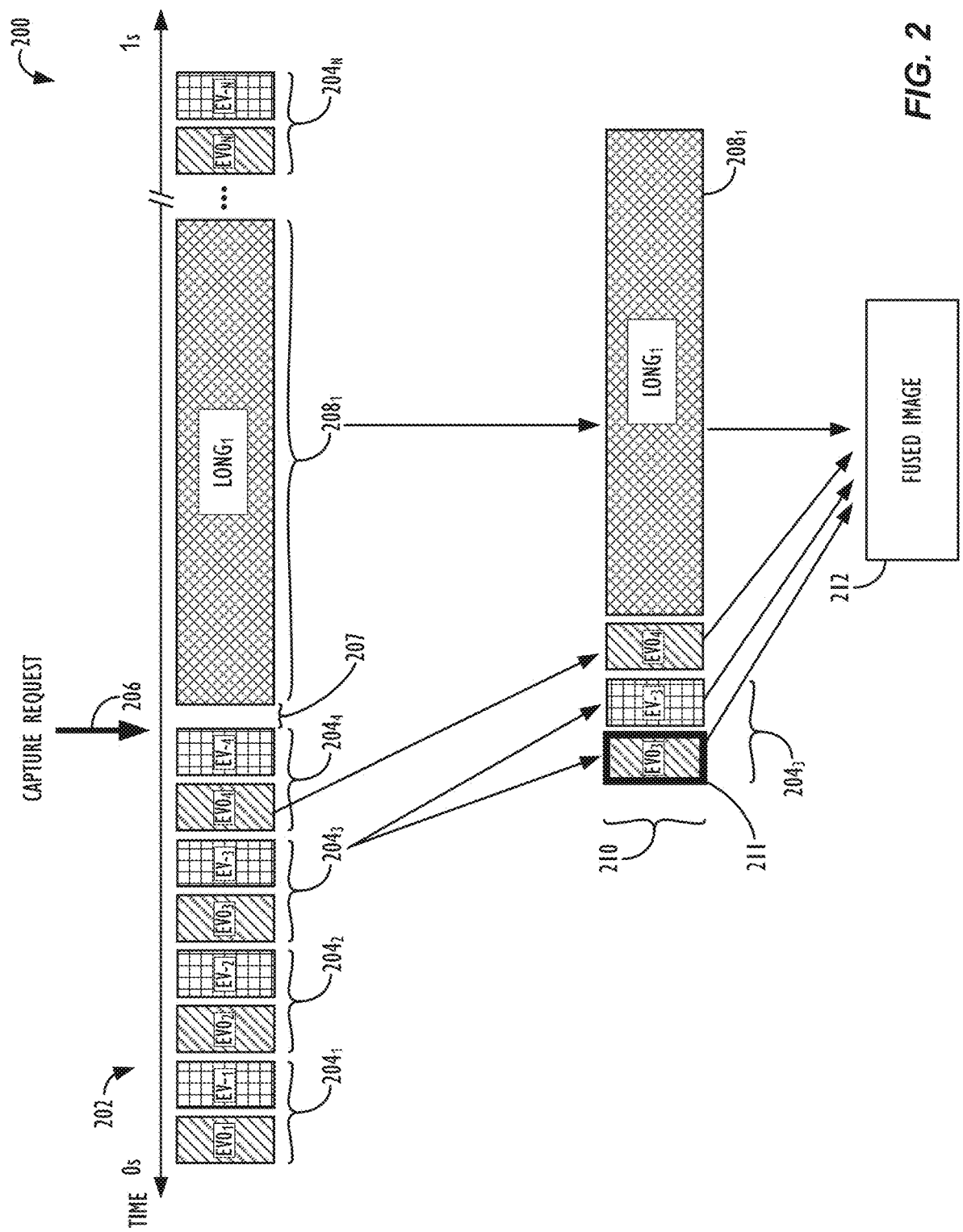
FIG. 2 illustrates an exemplary incoming image stream that may be used in an adaptive image bracket selection, fusion, and/or noise reduction method, according to one or more embodiments.

As mentioned above, the constituent images used for the adaptive fusion and noise reduction techniques described herein may be obtained from an incoming image stream obtained at an image capture device, comprising of a plurality of images captured with different exposure parameters, and thus different noise characteristics. For example, according to some embodiments, the incoming image stream may comprise a combination of: EV−, EV0, EV+, and/or other shorter or longer exposure images. Referring now to FIG. 2, an exemplary incoming image stream 200 that may be used in an adaptive image bracket selection, fusion, and/or noise reduction method is shown, according to one or more embodiments.

Images from incoming image stream 200 may be captured along a timeline, e.g., exemplary image capture timeline 202, which runs from a starting point labeled 0 seconds, to a point labeled as 1 second. It is to be understood that this timeline is presented merely for illustrative purposes, and that a given incoming image stream could be captured for seconds, minutes, hours, days, etc., based on the capabilities and/or needs of a given implementation.

According to some embodiments, EV0 image frames in the incoming image stream may, by default, be captured according to a first frame rate, e.g., 15 frames per second (fps), 30 fps, 60 fps, etc. In some embodiments, this frame rate may remain constant and uninterrupted, unless (or until) a capture request 206 is received at the image capture device. In other embodiments, the frame rate of capture of EV0 image frames may vary over time, based on, e.g., one or more device conditions, such as device operational mode, available processing resources, ambient lighting conditions, thermal conditions of the device, etc.

In other embodiments, one or more captured EV0 images may be paired with another image as part of a "secondary frame pair" (SFP). The SFP, according to some embodiments, may comprise an image that is captured and read out from the image sensor consecutively, e.g., immediately following, the capture of the corresponding EV0 image. In some embodiments, the SFP may comprise an EV0 image and: an EV−1 image frame, an EV−2 image frame, or an EV−3 image frame, etc. EV− images will have a lower exposure time and thus be somewhat darker and have more noise than their EV0 counterpart images, but they may do a better job of freezing motion, representing detail in the darker regions of images, and/or preserving a brighter dynamic range for regions in the image where the EV0 image may be overexposed.

In the example shown in FIG. 2, SFPs 204 are captured sequentially by the image capture device (e.g., 204$_1$, 204$_2$, 204$_3$, 204$_4$, and so forth), with each SFP including two images with differing exposure values, e.g., an EV0 image and a corresponding EV− image. Note that the EV0 and EV− images illustrated in FIG. 2 use a subscript notation (e.g., EV$_{-1}$, EV$_{-2}$, EV$_{-3}$, EV$_{-4}$, and so forth). This subscript is simply meant to denote different instances of images being captured (and not different numbers of exposure stops). It is to be understood that, although illustrated as pairs of EV0 and EV− images in the example of FIG. 2, any desired pair of exposure levels could be utilized for the images in an SFP, e.g., an EV0 image and an EV−2 image, or an EV0 image and in EV−3 image, etc. In other embodiments, the SFP may even comprise more than two images (e.g., three or four images), based on the capabilities of the image capture device.

Moving forward along timeline 202 to the capture request 206, according to some embodiments, a long exposure image 208$_1$ may be captured by the image capture device in response to the receipt of the capture request 206. According to some embodiments, an additional delay 207 may be built in to the image capture stream following the receipt of an capture request 206, e.g., so that any shaking or vibrations caused by a user's touching or selection of a capture button on the image capture device (e.g., either a physical button or software-based user interface button or other graphical element) may be diminished before the initiation of the long exposure image capture, which, although more likely to produce a low-noise image, is potentially more prone to blurring, and thus lack of sharpness, due to the amount of time the shutter stays open during the capture of the long exposure image.

Based on the evaluation of one or more capture conditions and/or implementation preferences, the image capture device may then select two or more images 210 for inclusion in the image fusion operation. In the example of FIG. 2, the images: $EV0_3$, $EV_{-3}$, $EV0_4$, and $LONG_1$ have been selected for inclusion in the fusion operation, and, in particular, one of images $EV0_3$ or $EV_{-3}$ (from secondary frame pair $204_3$) may be selected to serve as the reference image for the resultant fused image. In the example illustrated in FIG. 2, secondary frame pair $204_3$ may have been selected as the image pair from which the reference image will be selected (i.e., the "selected reference image pair"), due, e.g., to the fact that $EV0_3$ may be the sharpest EV0 image from among the EV0 images being considered for the fusion operation (or whatever image aspect or combination of aspects the reference image selection decision may be based on for a given implementation).

According to such embodiments, from the selected reference image pair (e.g., comprising one EV0 image and one EV− image), the process may select one image to serve as the reference image 211, e.g., either the EV0 image or the EV− image from the selected reference image pair. The determination of which image from the selected reference image pair to select to serve as the reference image for the fusion operation may be based on a number of factors. For example, the determination may be based on various image aspects, such as: noise level, sharpness, and/or the presence (or prevalence) of ghosting artifacts. For example, in order to ensure lower noise, the EV0 image may be selected as the final reference image, especially in lower ambient light level conditions. On the other hand, e.g., in dynamic scenes with moving objects and/or people, the EV− image may be preferred as the final reference image because it ensures a shorter exposure time and hence less motion blurring than the corresponding EV0 image from the selected reference image pair.

In the example illustrated in FIG. 2, $EV0_3$ has been selected to serve as the reference image 211 for the fusion operation (as indicated by the thicker border line on $EV0_3$). Once a final reference image is selected, each of the other selected images 210, e.g., including $EV_{-3}$, $EV0_4$ and long exposure image $208_1$ in the example illustrated in FIG. 2, may be selected as the candidate images for the fusion operation and registered with respect to the reference image 211.

As described above, e.g., with reference to FIGS. 1B and 1C, a fusion operation involving the selected images 210 (e.g., the reference image and various candidate images) will result in fused image 212. The decision of which images to include in the fusion operation may be based on a set of predetermined rules and/or decision tree that may be used to translate various capture conditions (or other parameters) into the particular set of images that will be selected for the image fusion operation. The decisions regarding whether (or to what extent) each of the selected images 210 should influence each pixel position in the final fused image at 212 may be based on a desired weighting scheme, e.g., the hybrid similarity weighting and variance minimizing weighting scheme described above with reference to FIGS. 1B and 1C. The decision as to whether (or to what extent) a candidate pixel should influence a corresponding reference pixel may also utilize a desired distance measure, e.g., the asymmetric distance measure described above with reference to FIGS. 1B and 1C.

Exemplary Noise Graphs

Figure 3A:
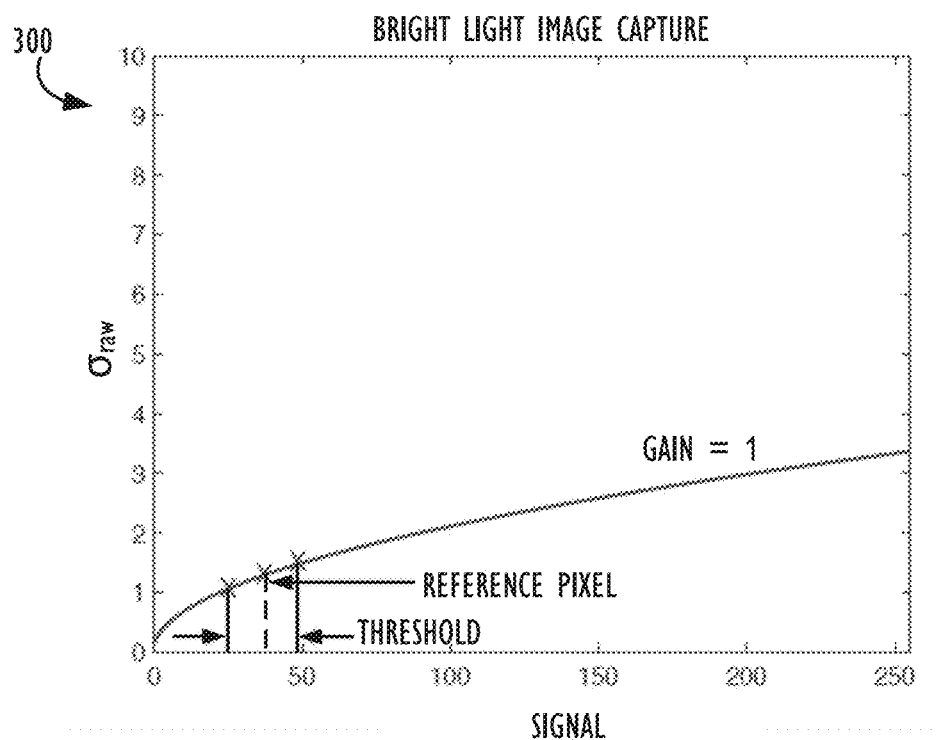
FIG. 3A illustrates exemplary signal level-to-predicted noise graphs for images captured with different gains, according to one or more embodiments.
Figure 3A:
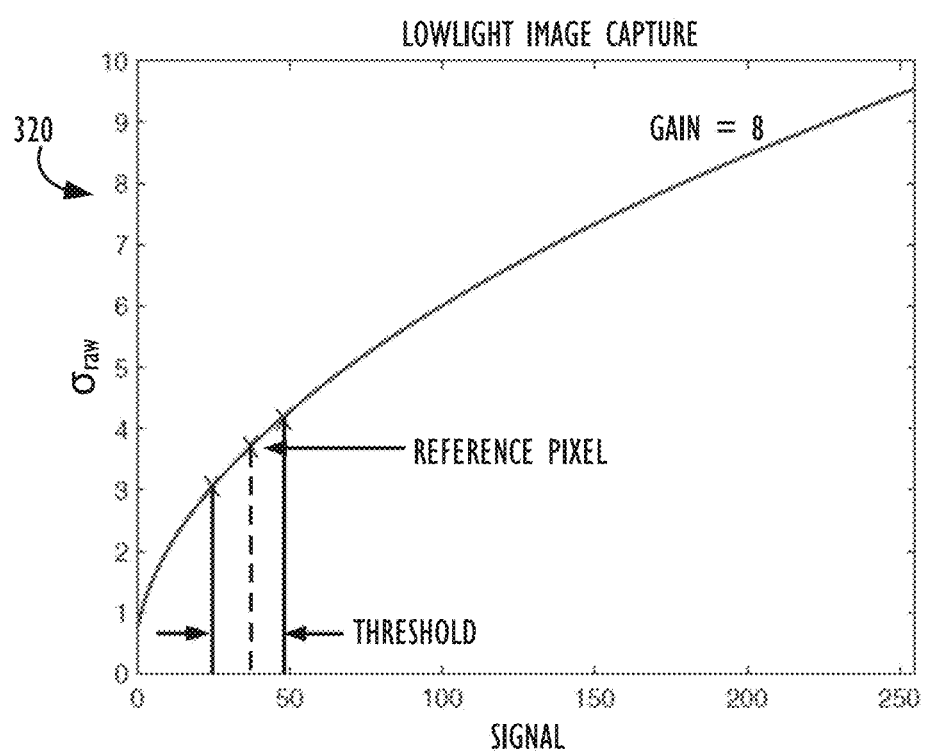

FIG. 3A illustrates exemplary signal-level-to-predicted-noise graphs (300/320) for images captured with different gains, according to one or more embodiments. The x-axes of the graphs represent signal values, and the y-axes represent a noise estimate for a corresponding pixel (in the RAW image data domain, in this case). In particular, graph 300 represents an exemplary image taken in bright environmental lighting conditions (as indicated by the curve being labeled 'gain 1'). An analog gain of 1 would typically be used in environments where there is no need to apply additional amplification to the captured signal to obtain a satisfactory signal-to-noise ratio. Of the 3 x-marks along the curve in graph 300, the central x-mark represents an exemplary reference pixel brightness level of, e.g., 40. The left and right x-marks along the curve in graph 300 represent the exemplary threshold values within which a candidate pixel may be deemed "similar" to a reference pixel having a brightness level of 40. For example, this range may extend to pixel values between roughly 30 and 50. As is illustrated in graph 300, the range of expected noise values (i.e., as shown along the y-axis) from the lower threshold signal value to the upper threshold signal value is relatively small, with all expected noise values falling between 1 and about 1.5 on the y-axis, so a simple averaging of pixels within this range (e.g., in a fusion operation involving only images following the noise curve in graph 300) may work sufficiently well.

By contrast, graph 320 represents a scenario in which an exemplary image has been taken in dim environmental lighting conditions (as indicated by the curve being labeled 'gain 8'). An analog gain of 8 would typically be used in environments where there is need for a large amplification to capture a sufficient amount of signal. The tradeoff is higher noise at equivalent captured signal values, e.g., when compared to graph 300. As with graph 300, of the 3 x-marks along the curve in graph 320, the central x-mark represents an exemplary reference pixel brightness level of, e.g., 40. The left and right x-marks along the curve in graph 320 represent the exemplary threshold values within which a candidate pixel may be deemed "similar" to a reference pixel having a brightness level of 40. For example, this range may extend to pixel values between roughly 30 and 50. As is illustrated in graph 320, however, the range of expected noise values (i.e., as shown along the y-axis) from the lower threshold signal value to the upper threshold signal value is relatively large, with expected noise values falling between 3 and about 4.2 on the y-axis. This means that fusing similar pixels from relatively lower light constituent images (e.g., EV− images) is likely to, on average, introduce a much greater amount of noise than an image having a longer exposure, so a simple averaging of pixels within this signal range (i.e. roughly between signal values of 30 and 50) from images with a gain of 8 may not work very well. The tradeoff of the higher noise variance associated with lower light constituent images (e.g., EV− images) is that they are likely to do a better job of freezing motion in the scene than a corresponding image of the scene having a longer exposure (and, hence, lower noise). As may now be understood, both types of images may have a valuable role to play in the image fusion process, so long as each image contributes pixels to the resultant fused image in the appropriate parts of the scene and/or to the optimal extent (i.e., with optimal weighting), e.g., based on the expected amount of noise that is predicted to be present in a given pixel.

Figure 3B:
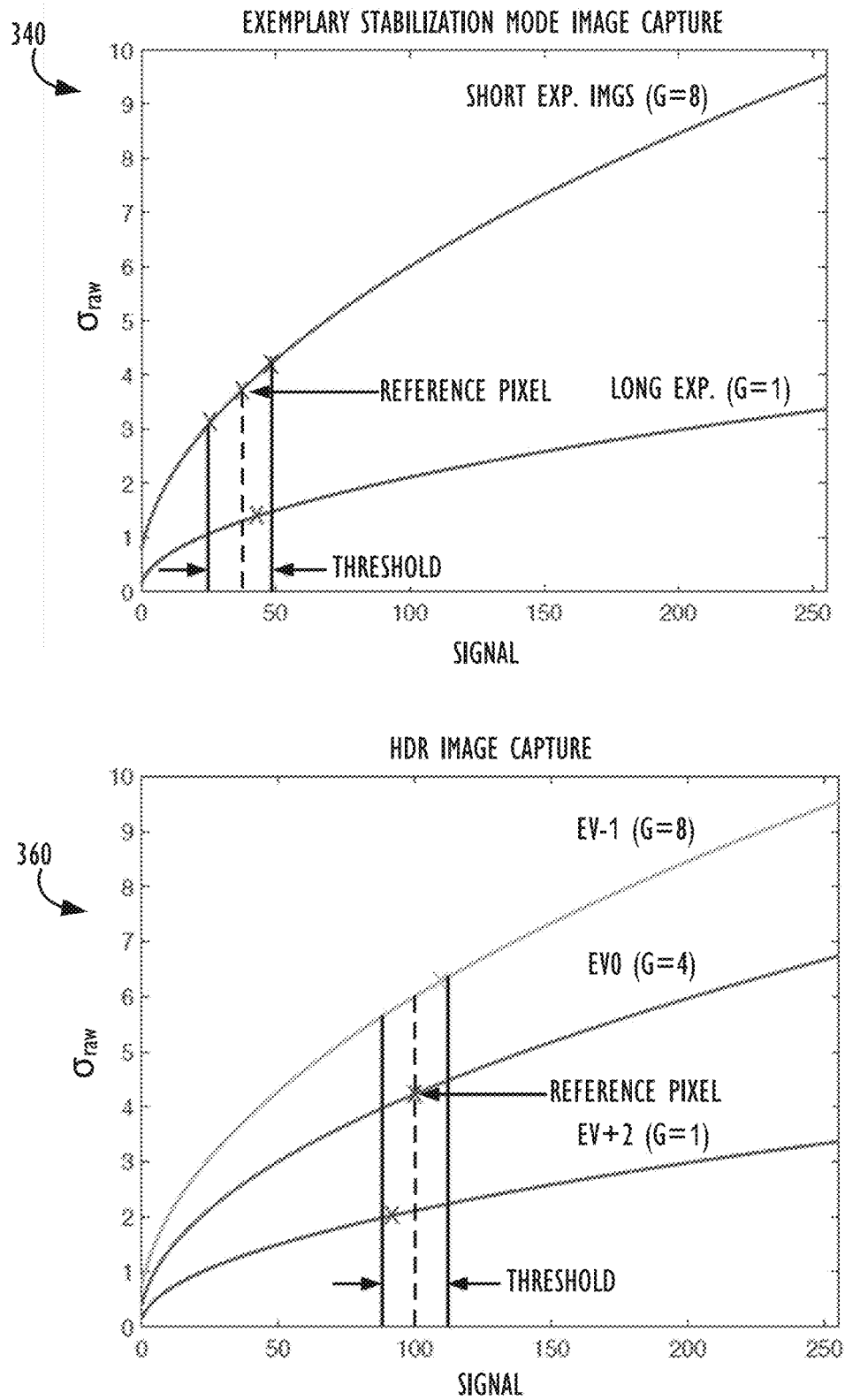
FIG. 3B illustrates exemplary signal level-to-predicted noise graphs for images captured with different exposure value settings, according to one or more embodiments.

FIG. 3B illustrates exemplary signal-level-to-predicted-noise graphs (340/360) for images captured with different exposure value settings, according to one or more embodiments. For example, graph 340 represents an image capture scenario where a stabilization mode is employed, which may involve the fusion of multiple short exposure images captures (labeled "short exp. imgs"), reflecting, e.g., images captured with a gain value of 8 (such as shown in graph 320), and a single long exposure images capture (labeled "long exp."), reflecting, e.g., images captured with a gain value of 1 (such as shown in graph 300). As with the exemplary graphs shown in FIG. 3A, within the similarity threshold (i.e. roughly between signal values of 30 and 50), the short exposure images are quite close noise-wise, but the noise is much lower in the long exposure image over the same signal value range.

Similarly, in graph 360, which may represent, e.g., a High Dynamic Range (HDR) capture embodiment, involving the fusion of an underexposed (EV−1) image (e.g., with gain of 8), a correctly-exposed (EV0) image (e.g., with gain of 4), and an over-exposed (EV+2) image (e.g., with gain of 1). The noise characteristics of the various images are quite different, as can be seen in graph 360 of FIG. 3B. For example, as shown in FIG. 3B, within the similarity threshold (i.e. roughly between signal values of 90 and 110), the expected noise level of the corresponding pixels (represented by the x-marks along the curves) are: 6.3 in the EV−1 image; 4.0 in the EV0 image; and 1.7 in the EV+2 image. Thus, again, a simple averaging scheme may not work suitably well if attempting to fuse together the three representative images reflected in graph 360, owing at least in part to their widely-varying noise estimates at similar pixel signal values.

Figure 3C:
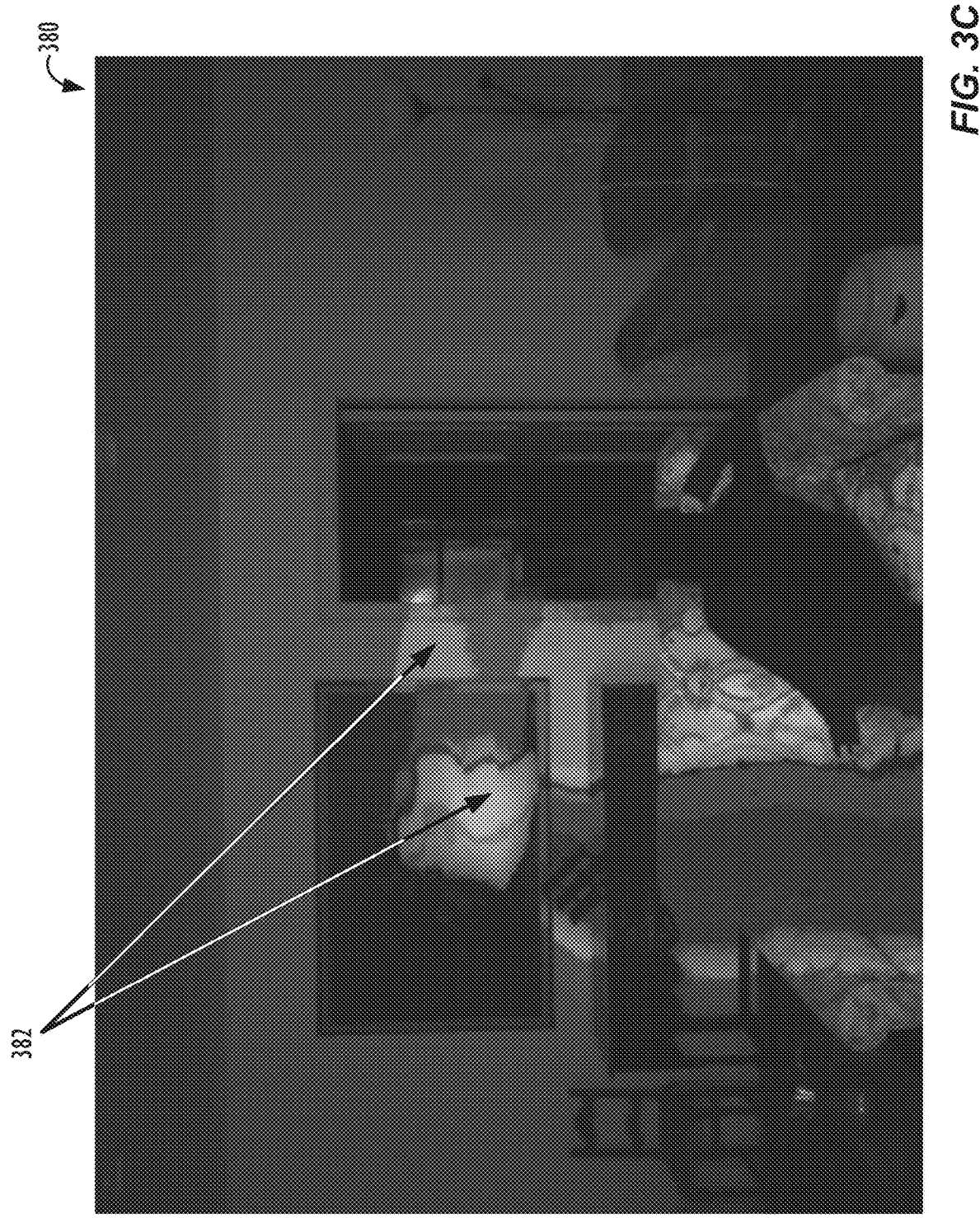
FIG. 3C illustrates an exemplary fusion-adaptive noise map, according to one or more embodiments.

FIG. 3C illustrates an exemplary fusion-adaptive noise map 380, according to one or more embodiments. Regions 382 (reflected with brighter pixel values in the noise map) correspond to areas that are predicted to have the highest noise levels (and thus the greatest need for noise reduction), e.g., due to the pixels in this part of the resultant fused image coming wholly (or at least in part) from a short exposure constituent image (e.g., an EV− image) or other type of constituent image that is predicted to have high noise at the particular regions in the fused image. As may now be appreciated, fusion-adaptive noise map 380 represents an example of the fusion-adaptive noise map 172 discussed above with reference to FIG. 1D. In other words, the values in exemplary fusion-adaptive noise map 380 may take into account each of: the predicted noise level at each individual pixel location in each constituent image contributing the fusion; the respective contribution amounts of each constituent image contributing the fusion; and/or the boosting factor determined (if one is so desired) for each constituent image contributing the fusion. One exemplary equation for determining the fusion-adaptive noise map values was given above in Eqn. 18. The values in exemplary fusion-adaptive noise map 380 may be used to directly determine the strength of noise reduction to apply to each pixel in the resultant fused image (e.g., fused image 174 discussed above with reference to FIG. 1D). The result of such noise reduction operation will be a resultant image that has been adaptively fused and denoised based on such adaptive fusion.

As may also be appreciated, the fusion-adaptive noise reduction techniques described herein may provide the added benefit of only needing to be run once on each fused image (instead of being run separately on each constituent image, e.g., before the fusion operation). As such, the computation and power usage requirements of the described techniques of performing noise reduction are lesser than prior art techniques that individually performed noise reduction on each constituent image before the fusion operation.

Exemplary Electronic Device

Figure 4:
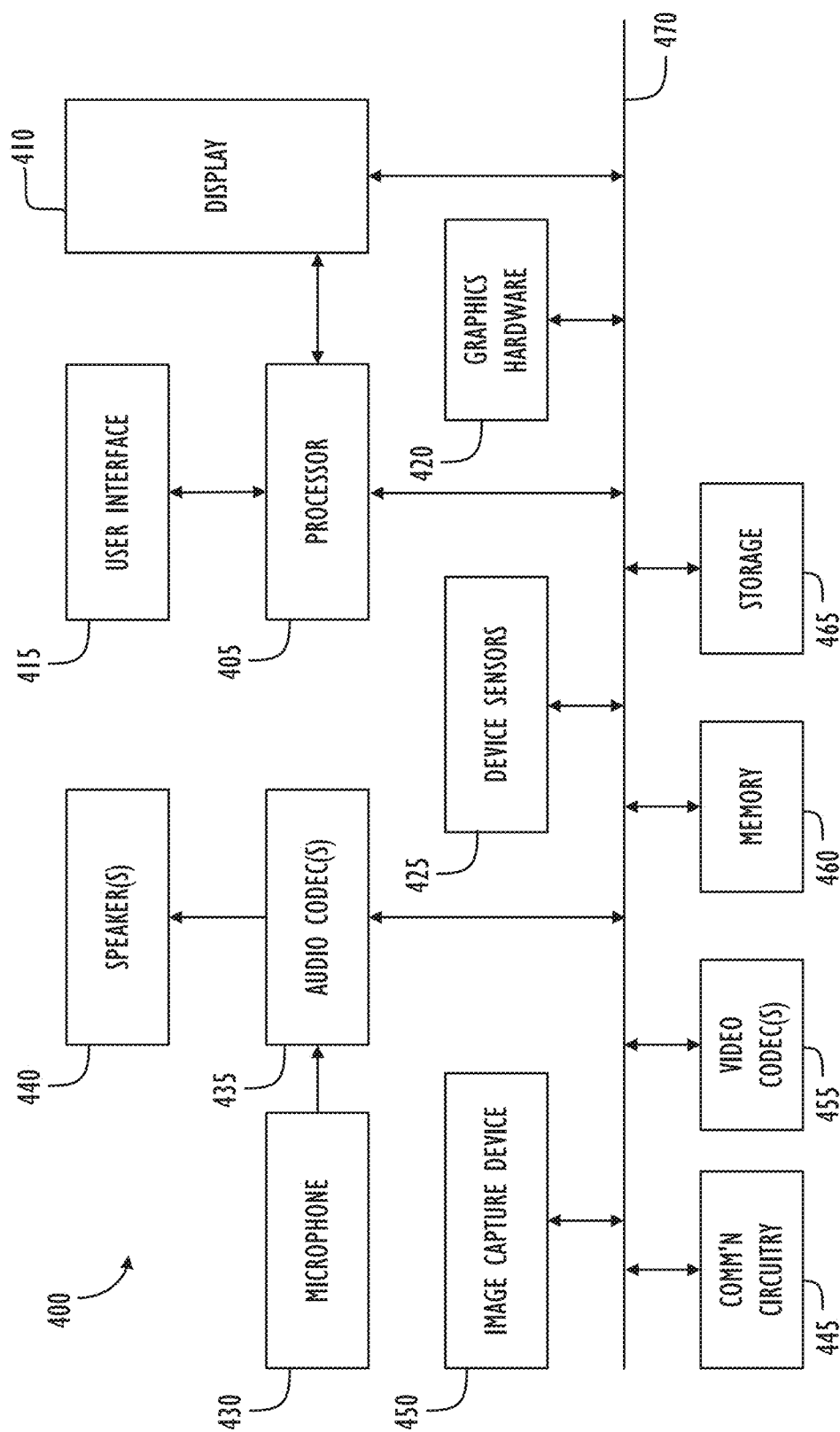
FIG. 4 is a block diagram illustrating a programmable electronic computing device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., SIS, HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate fused and/or noise-reduced versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices;
a display; and
one or more processors operatively coupled to the memory, wherein the one or more processors are configured to execute instructions causing the one or more processors to:
obtain an incoming image stream from the one or more image capture devices;
select two or more images from the incoming image stream, wherein one of the selected two or more images is designated to be a reference image, and wherein the selected two or more images that are not designated to be the reference image are designated to be candidate images;
for each candidate image: register the respective candidate image to the reference image, wherein the registration provides a correspondence between the reference image and the respective candidate image;
obtain a noise model corresponding to each candidate image and the reference image, wherein each obtained noise model specifies an estimated noise variance for a plurality of pixels in its respective corresponding image;
derive weight maps corresponding to each candidate image and the reference image, wherein each derived weight map comprises a plurality of values corresponding to pixels in the weight map's corresponding image, wherein the values in each weight map are based, at least in part, on determining a minimum variance weight for each pixel in the respective weight map's corresponding image, and wherein each value in a weight map indicates an amount of contribution the corresponding pixel in the weight map's corresponding image will have in a fusion operation;
fuse each registered candidate image and the reference image according to the derived weight maps to form a fused image; and
store the fused image in the memory.

2. The device of claim 1, wherein the incoming image stream comprises images with two or more different exposure values.

3. The device of claim 2, wherein the selected two or more images comprise: at least one ideal exposure value (EV0) image.

4. The device of claim 3, wherein the selected two or more images further comprise: at least one underexposed value (EV−) image.

5. The device of claim 4, wherein the selected two or more images further comprise: at least one overexposed value (EV+) image.

6. The device of claim 1, wherein the instructions to register a respective candidate image to the reference image further comprise instructions to: perform an image registration process between the respective candidate image and the reference image, wherein the image registration process provides a correspondence between one or more pixels in the respective candidate image and a pixel in the reference image.

7. The device of claim 6, wherein the correspondence provided by the image registration process between a first pixel in the respective candidate image and the reference image is updated based on locating a better matching pixel in the respective candidate image in a neighborhood of pixels around the first pixel.

8. The device of claim 1, wherein the values in each weight map corresponding to a candidate image are based, at least in part, on a distance measure between a respective candidate image pixel's value and a value of the corresponding pixel in the reference image.

9. The device of claim 8, wherein the distance measure comprises an asymmetric distance measure.

10. The device of claim 1, wherein the values in each weight map corresponding to a candidate image are based, at least in part, on an evaluation of a pixel similarity threshold between a respective candidate image pixel's value and a value of the corresponding pixel in the reference image.

11. The device of claim 10, wherein the evaluation of the pixel similarity threshold between a respective candidate image pixel's value and a value of the corresponding pixel in the reference image comprises a binary determination whether to include or not include the respective candidate image pixel's value in the fusion operation.

12. The device of claim 10, wherein a value of the pixel similarity threshold between a respective candidate image pixel and the corresponding pixel in the reference image is based, at least in part, on information regarding tea presence of high-level features within the reference image at the location of the corresponding pixel in the reference image.

13. The device of claim 1, wherein the minimum variance weights for pixels in each weight map are based on a reciprocal of the estimated noise variance for the respective pixel.

14. The device of claim 1, wherein the instructions to fuse each registered candidate image and the reference image according to the derived weight maps to form a fused image further comprise instructions to: compute a weighted sum for each pixel location in the fused image, wherein the weighted sum for each pixel location comprises a sum of the products of each of the values from the derived weight maps corresponding to the respective pixel location and the values of the corresponding pixels in the weight maps' respective corresponding images.

15. A non-transitory program storage device comprising instructions stored thereon to cause one or more processors to:
- obtain an incoming image stream from one or more image capture devices;
- select two or more images from the incoming image stream, wherein one of the selected two or more images is designated to be a reference image, and wherein the selected two or more images that are not designated to be the reference image are designated to be candidate images;
- for each candidate image: register the respective candidate image to the reference image, wherein the registration provides a correspondence between the reference image and the respective candidate image;
- obtain a noise model corresponding to each candidate image and the reference image, wherein each obtained noise model specifies an estimated noise variance for a plurality of pixels in its respective corresponding image;
- derive weight maps corresponding to each of candidate image and the reference image, wherein each derived weight map comprises a plurality of values corresponding to pixels in the weight map's corresponding image, wherein the values in each weight map are based, at least in part, on determining a minimum variance weight for each pixel in the respective weight map's corresponding image, and wherein each value in a weight map indicates an amount of contribution the corresponding pixel in the weight map's corresponding image will have in a fusion operation;
- fuse each registered candidate image and the reference image according to the derived weight maps to form a fused image; and
- store the fused image in a memory.

16. The non-transitory program storage device of claim 15, wherein the minimum variance weights for pixels in each weight map are based on a reciprocal of the estimated noise variance for the respective pixel.

17. An image processing method, comprising:
- obtaining an incoming image stream from one or more image capture devices;
- selecting two or more images from the incoming image stream, wherein one of the selected two or more images is designated to be a reference image, and wherein the selected two or more images that are not designated to be the reference image are designated to be candidate images;
- for each candidate image: registering the respective candidate image to the reference image, wherein the registration provides a correspondence between the reference image and the respective candidate image;
- obtaining a noise model corresponding to each candidate image and the reference image, wherein each obtained noise model specifies an estimated noise variance for a plurality of pixels in its respective corresponding image;
- deriving weight maps corresponding to each candidate image and the reference image, wherein each derived weight map comprises a plurality of values corresponding to pixels in the weight map's corresponding image, wherein the values in each weight map are based, at least in part, on determining a minimum variance weight for each pixel in the respective weight map's corresponding image, and wherein each value in a weight map indicates an amount of contribution the corresponding pixel in the weight map's corresponding image will have in a fusion operation;
- fusing each registered candidate image and the reference image according to the derived weight maps to form a fused image; and
- storing the fused image in a memory.

\* \* \* \* \*

UNITED STATES PATENT AND TRADEMARK OFFICE
CERTIFICATE OF CORRECTION

PATENT NO.         : 11,189,017 B1
APPLICATION NO.    : 16/563273
DATED              : November 30, 2021
INVENTOR(S)        : Farhan A. Baqai et al.

Page 1 of 1

It is certified that error appears in the above-identified patent and that said Letters Patent is hereby corrected as shown below:

In the Claims

Claim 12, at Column 28, Line 51, replace -- tea -- with "a"

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*